INVENTOR
HOWARD F. MASON
BY
HARRIS, KIECH, FOSTER & HARRIS

A. TORNEYS.

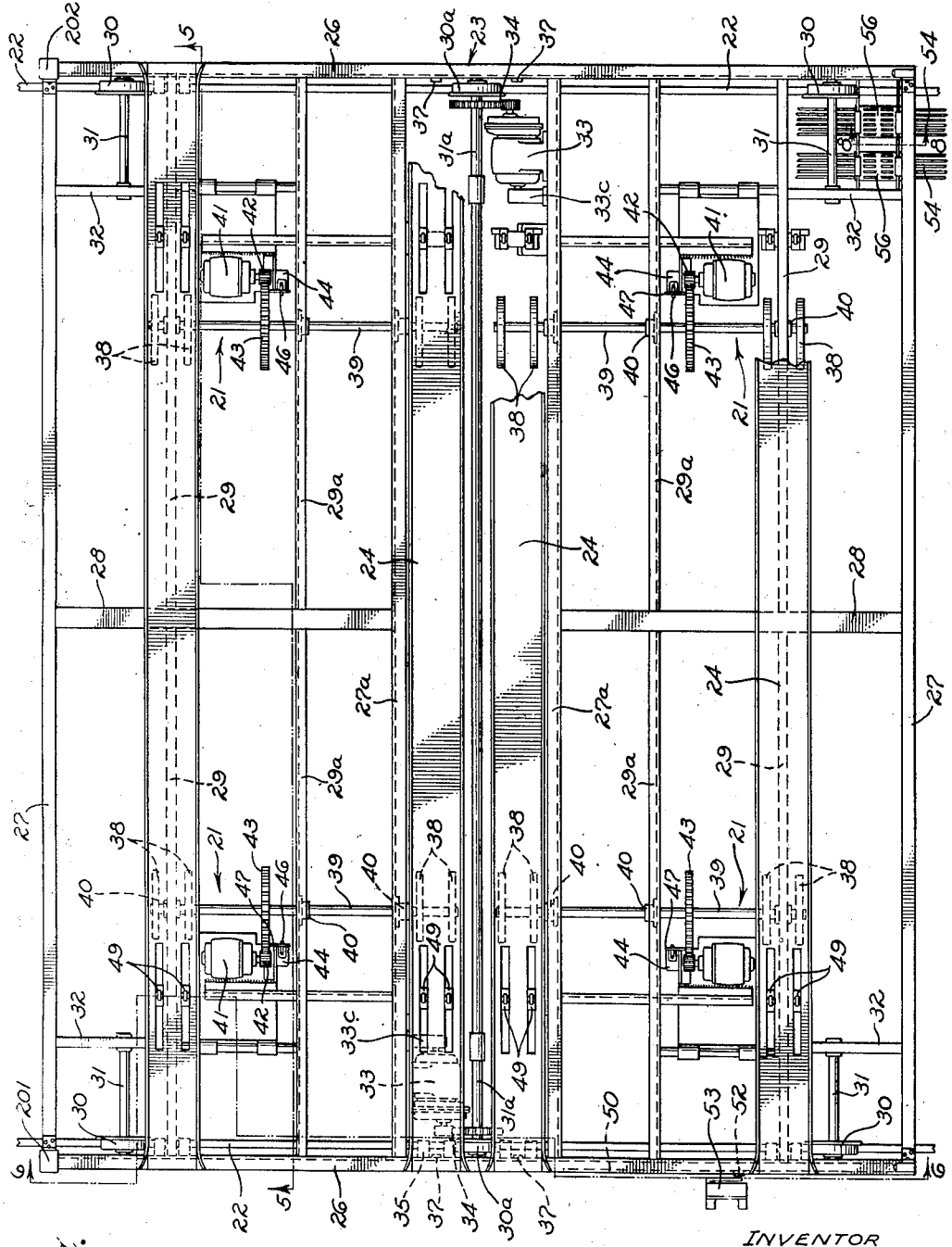

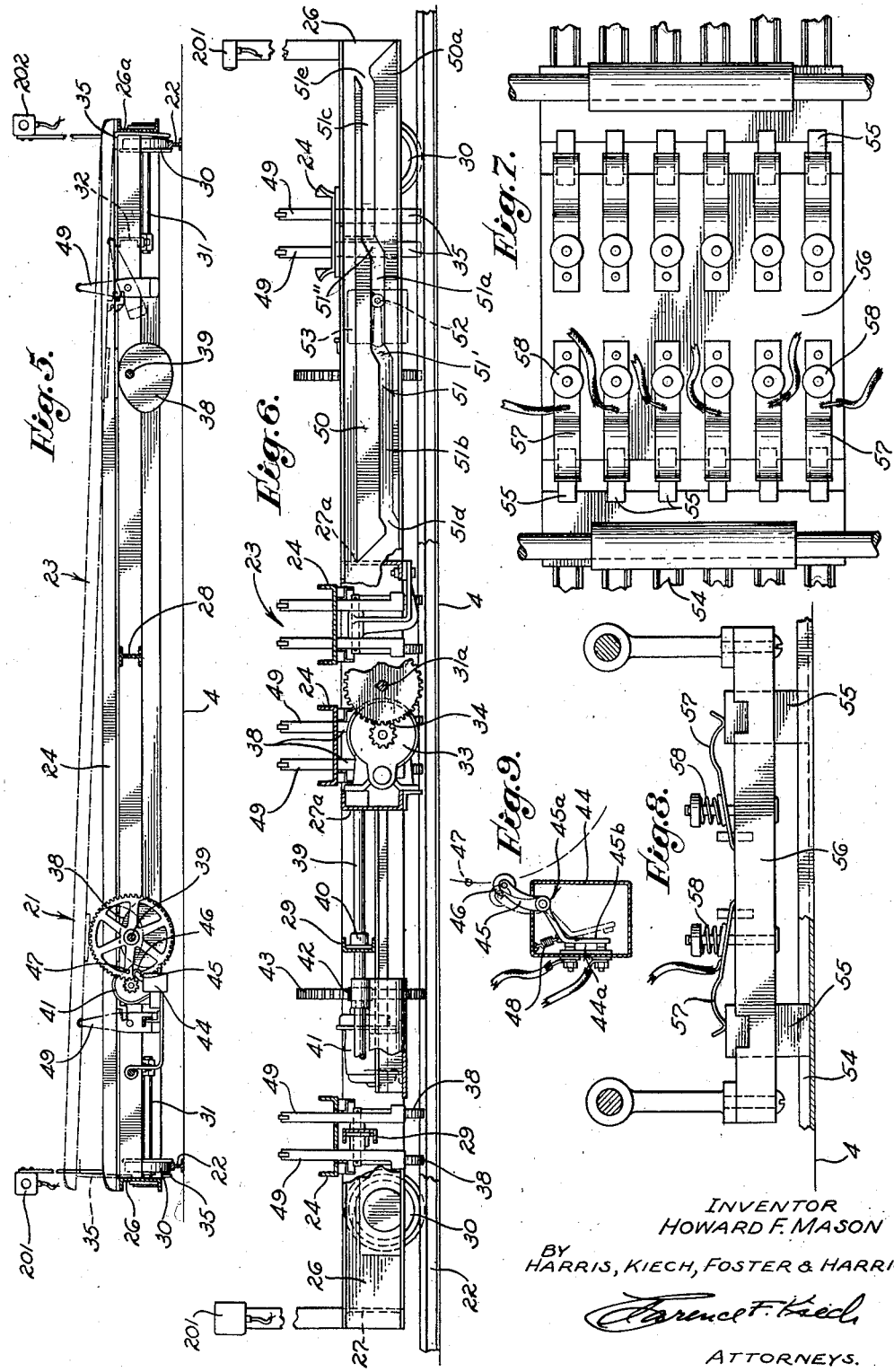

June 11, 1940.　　　　H. F. MASON　　　　2,204,023
PARKING DEVICE AND METHOD OF OPERATING
Filed Aug. 10, 1937　　　12 Sheets-Sheet 5
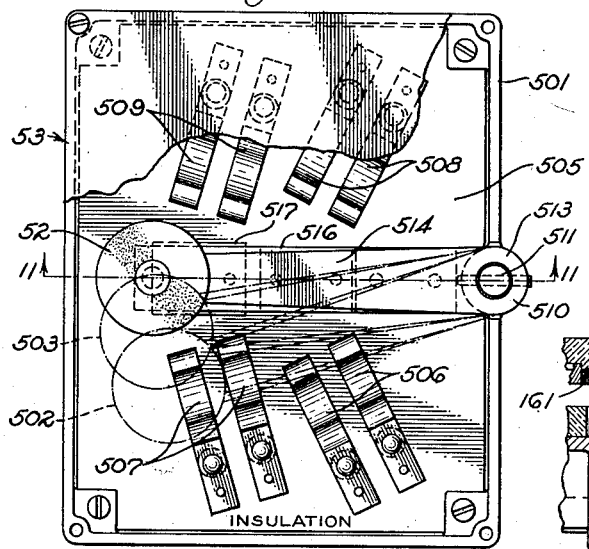
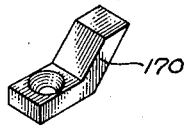
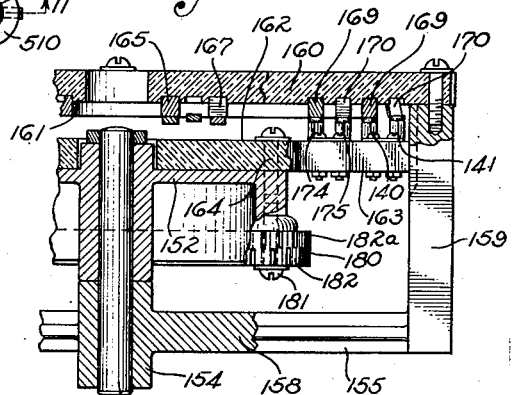
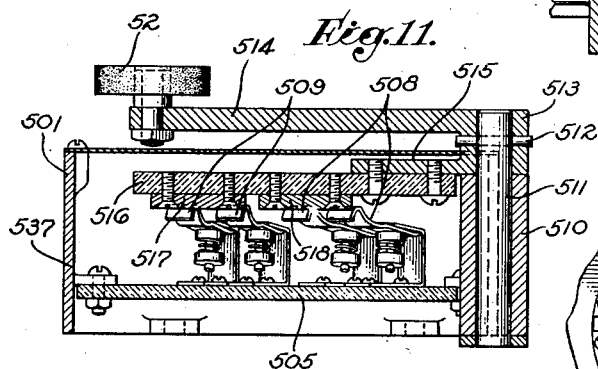
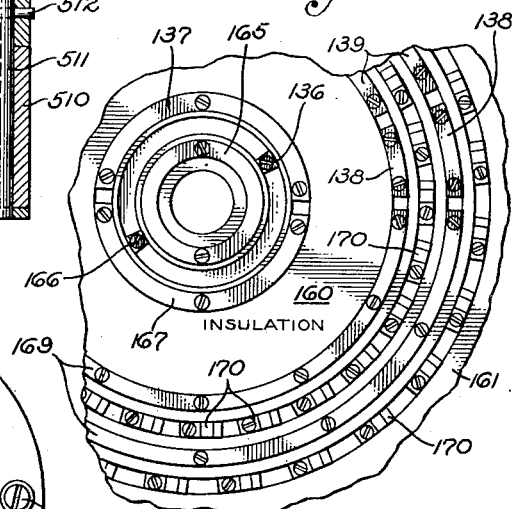
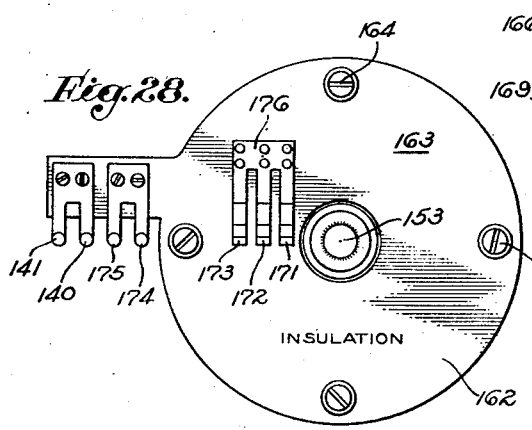
INVENTOR
HOWARD F. MASON
BY
HARRIS, KIECH, FOSTER & HARRIS
ATTORNEYS.

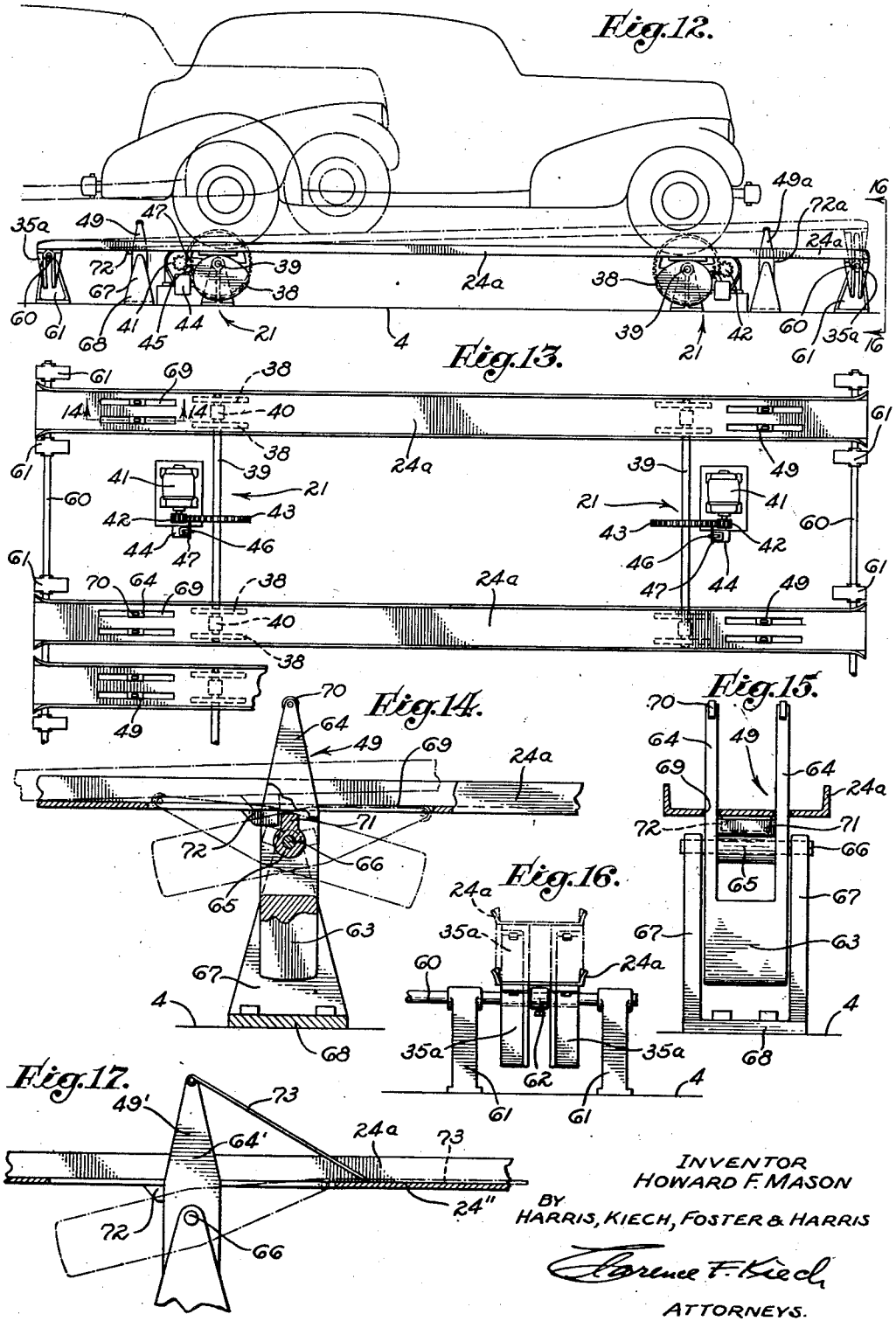

June 11, 1940.　　　　H. F. MASON　　　　2,204,023
PARKING DEVICE AND METHOD OF OPERATING
Filed Aug. 10, 1937　　　12 Sheets-Sheet 7
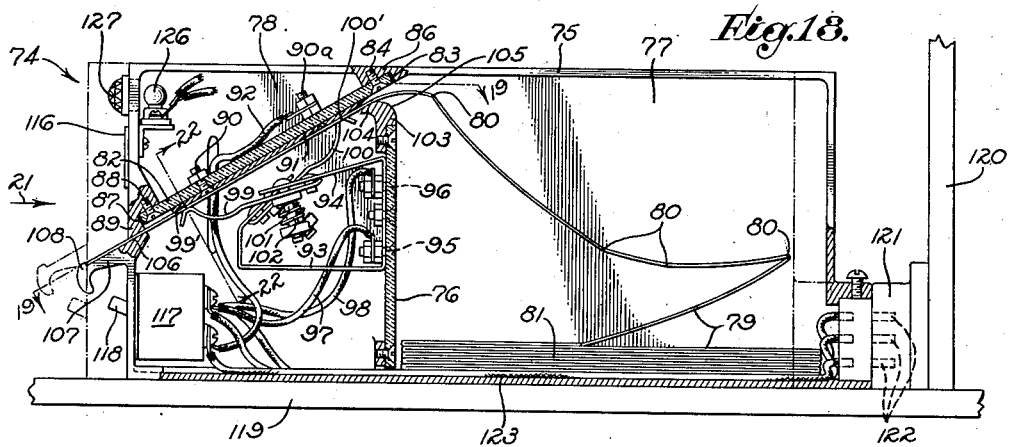
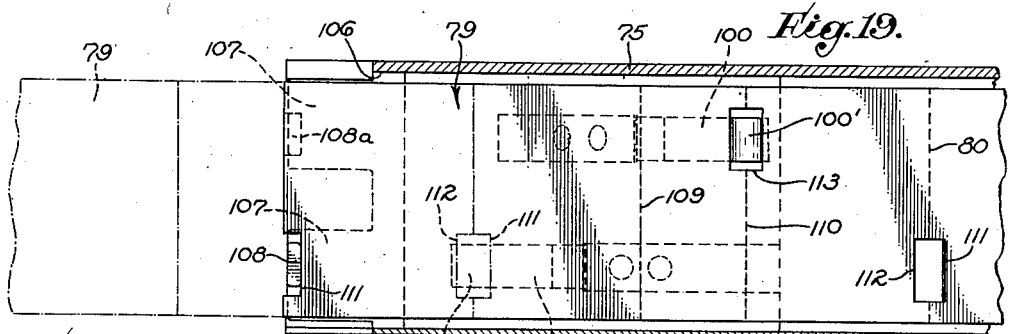
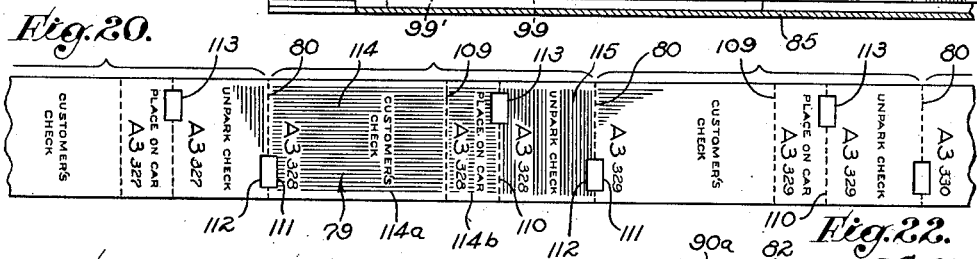
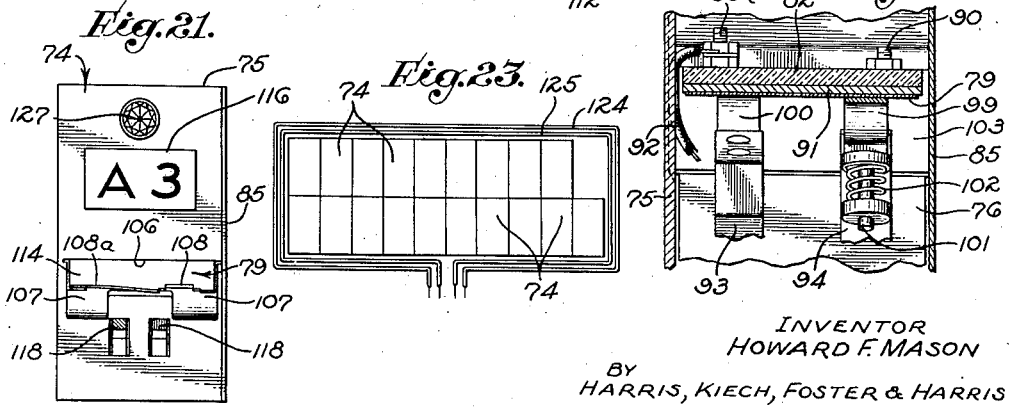
INVENTOR
HOWARD F. MASON
BY
HARRIS, KIECH, FOSTER & HARRIS
Clarence F. Kiech
ATTORNEYS.

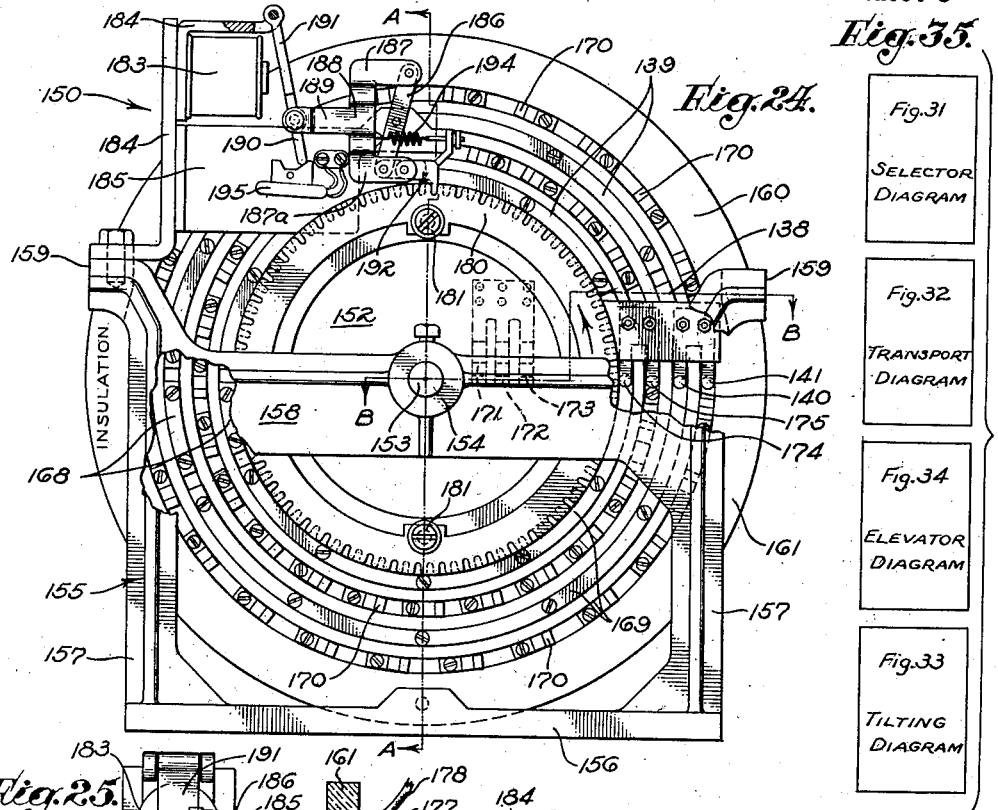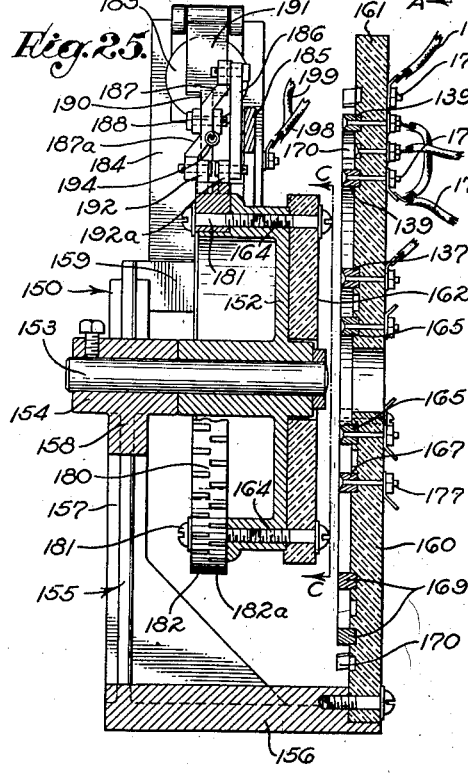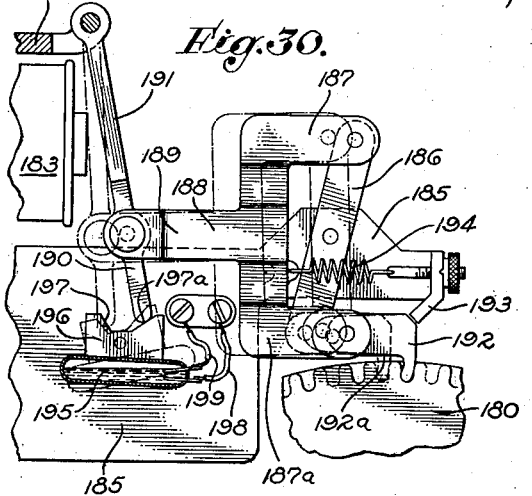

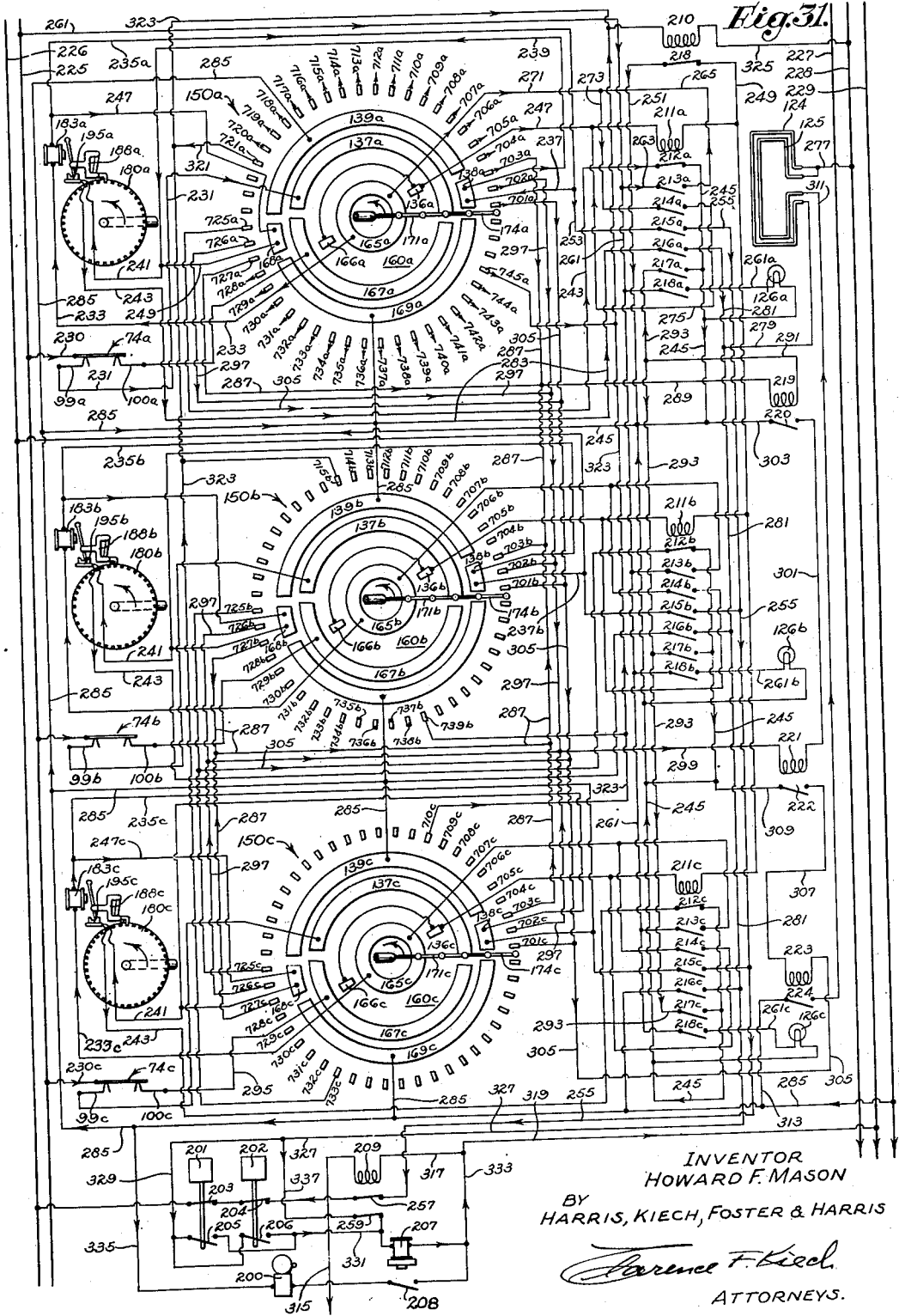

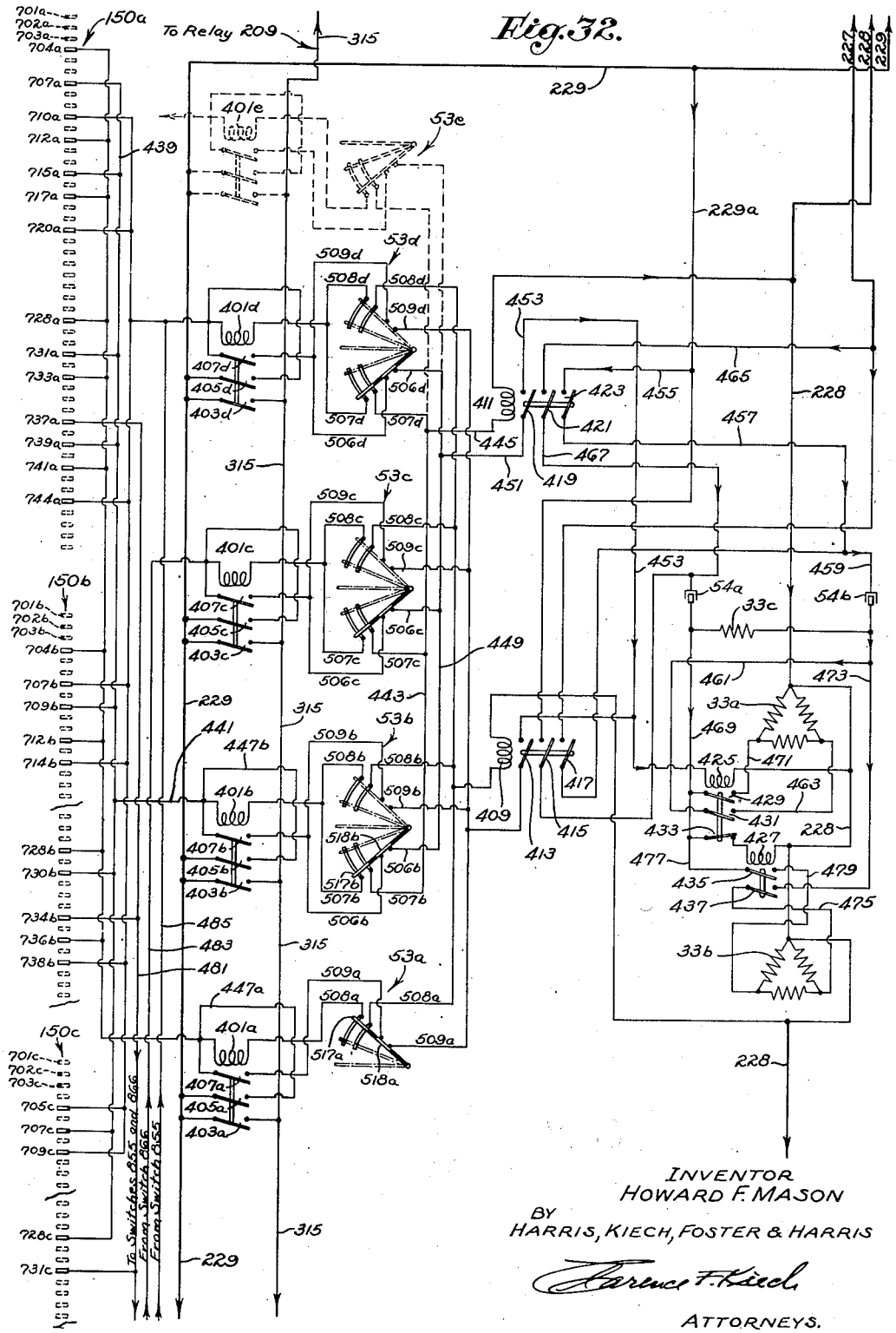

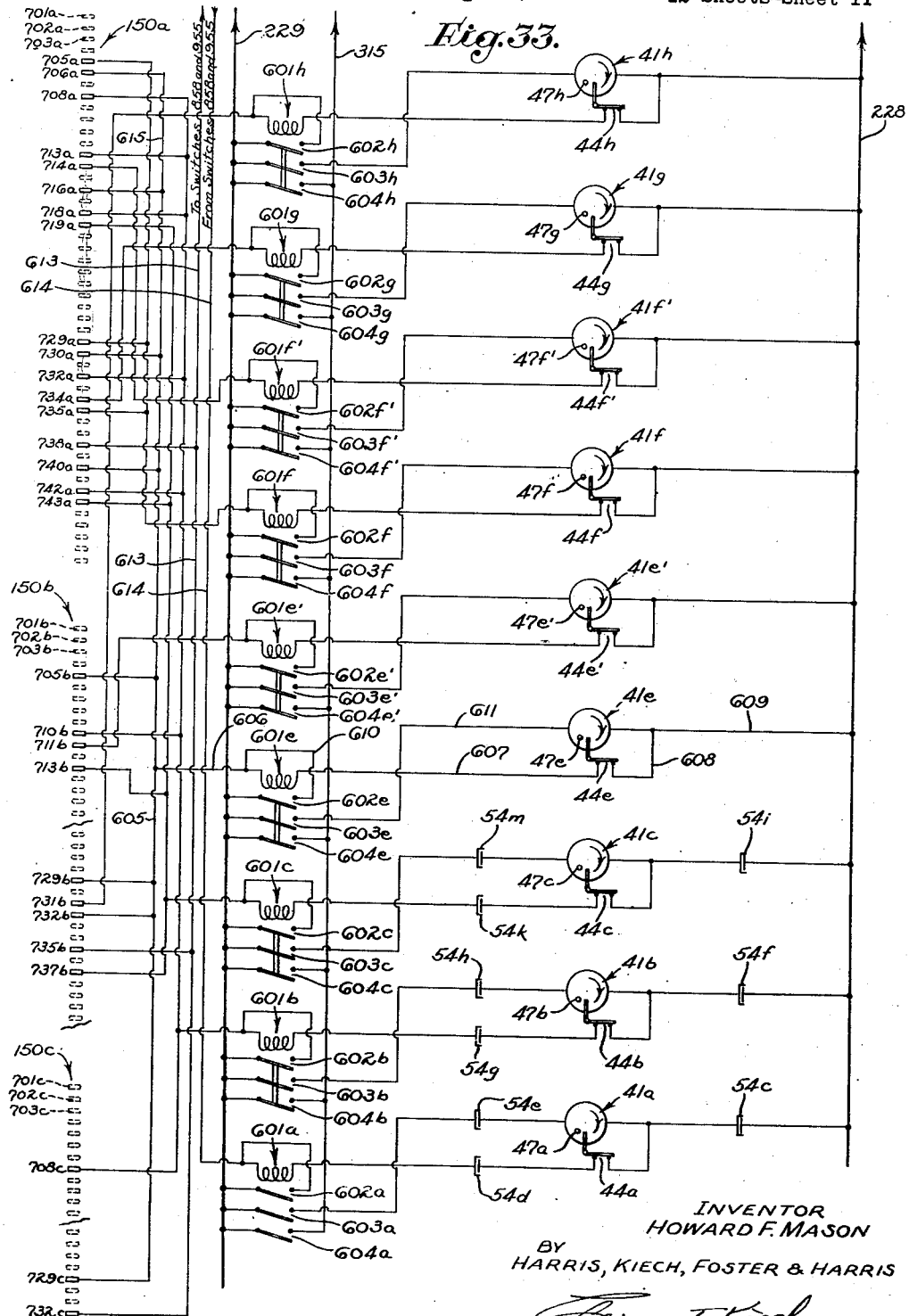

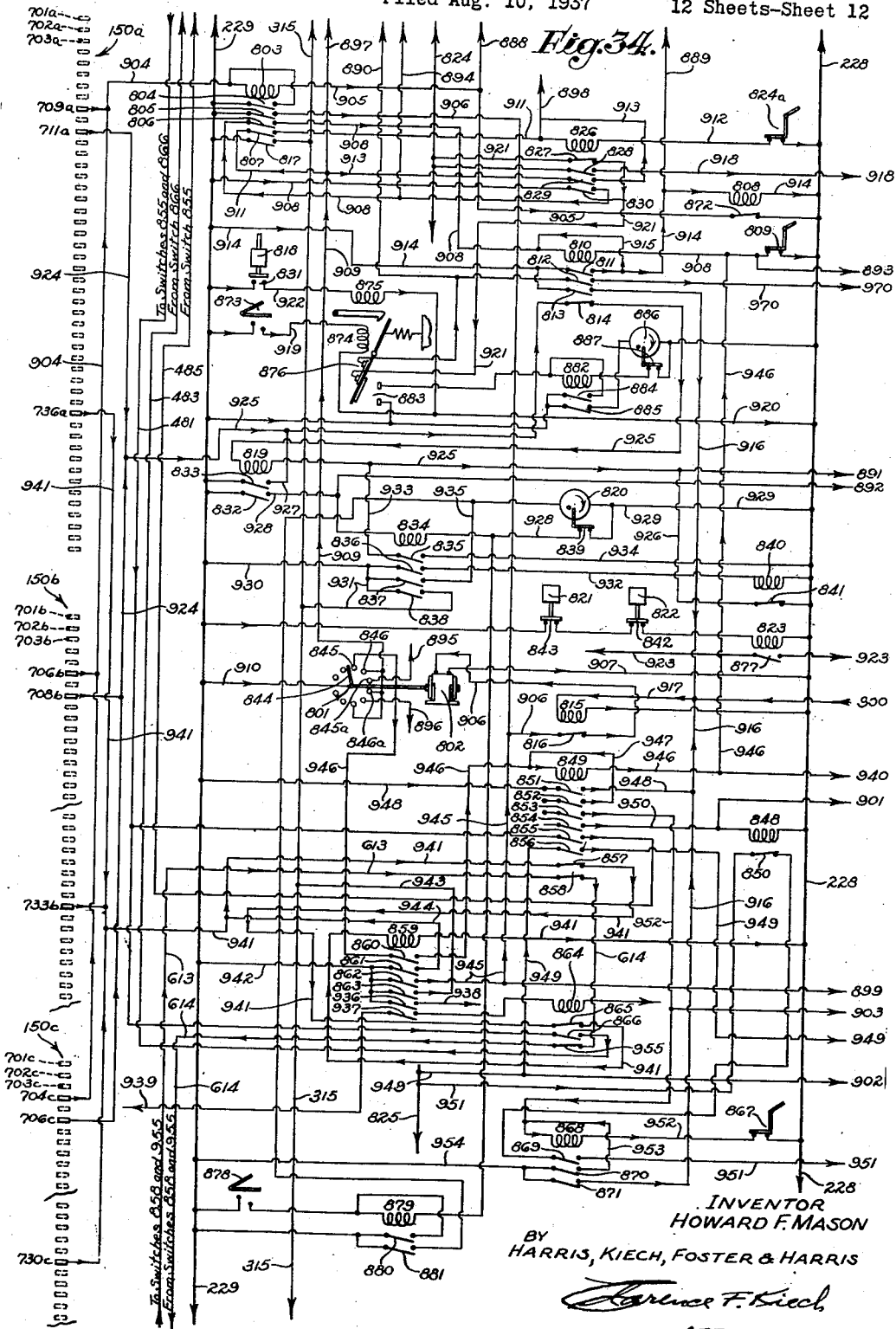

Patented June 11, 1940

2,204,023

UNITED STATES PATENT OFFICE 2,204,023

PARKING DEVICE AND METHOD OF OPERATING

Howard F. Mason, Los Angeles, Calif., assignor of one-half to August Slater, Los Angeles, Calif.

Application August 10, 1937, Serial No. 158,365

39 Claims. (Cl. 214—16.1)

This invention relates to storage or parking facilities for vehicles, and particularly for automobiles.

It relates more particularly to buildings for automobile storage or parking which have a plurality of floors or stories equipped with storage compartments, and one or more elevators arranged to convey the automobiles to and from the several floors where they are severally parked in the storage compartments.

One of the objects of the invention is to make provision for the storage of a maximum number of automobiles or similar objects in any given volume of building storage space. Another object is to provide storage facilities and a method for utilizing such facilities which will permit rapid placing or parking of the automobiles and reclaiming or unparking them from their respective parking locations for delivery to the driver at the building entrance.

Another object is to provide means and a method whereby an automobile may be temporarily shifted from one position to another on the storage floors to permit the parking or unparking of another automobile or automobiles in the rear thereof and thereafter returned to its initial parking position or stall, to the end that whenever it is desired to unpark any machine whatever for delivery to the driver, it shall always be found in its initial parking stall, thereby avoiding confusion and simplifying the keeping of records and handling of claim checks.

Another object is to provide storage or parking facilities of such a character as to lend themselves to the utilization of an automatic control whereby all or a part of the parking or unparking movements may be carried out by a single act of an operator or attendant.

Another object is to provide parking facilities and a parking system which can function with a minimum of operating personnel.

Another object is to provide such a parking system and such safety devices that danger of accident or damage to the cars or to the equipment is eliminated or reduced to a minimum.

Still another object of this invention is to provide storage facilities at a low first cost and which are adapted to function at a low operative cost.

Another object is to provide automatic actuating means whereby all or part of the several steps of the operation of moving a car from the building entrance to a predetermined stall and vice versa from a predetermined stall to the building entrance are carried on in proper sequence as the result of a single act of the operator or attendant.

Another object is to provide control features for such automatic actuating means whereby the operator may successively initiate several parking or unparking operations of several automobiles respectively, and when such operations involve the use of a common means element or elements, the second and later operations of such a succession shall be delayed until the first operation shall have completed its utilization of such common means element or elements.

Another object of this invention is to provide automatic means whereby when any automobile becomes accidentally stalled at any point in its automatic parking or unparking, the operator will be notified by appropriate signal and all interfering movements of any other car or cars will be automatically halted.

It is usual in operating an automobile storage business for the operator to deliver a claim check to the customer, which is torn along a perforated line from a retained ticket. In my invention, according to one of its features, these tickets are stored in a magazine from which they are extracted as they are used. One object of the invention is to utilize the act of withdrawal of the claim check to automatically set in operation the mechanism whereby the automobile is by a sequence of automatically controlled movements taken from the building entrance and placed in a predetermined stall corresponding to a number on the claim check, and to utilize later the act of withdrawal of the retained ticket of that same claim check to similarly remove the automobile from that stall and deliver it to the building entrance.

Other objects and advantages of this invention, residing in certain novel features of construction, arrangement, and combination of parts, will be apparent from the following description of embodiments of the invention and from the claims.

It will, of course, be understood that certain advantages of separate features of this invention are realizable without the presence of other features. For example, the following description is of a building having a plurality of floors. The invention, however, comprises features of construction and operation which are utilizable on a single floor or in a one-story building, and this invention, in so far as such features are concerned, is not limited to a building having more than one floor.

Reference has been frequently made to automobiles in the following description and claims. It will be understood, however, that my storage system and facilities are also utilizable in handling any other vehicles or movable objects adapted to be stored, and that I do not wish to be limited to an automobile storage system or automobile storage devices in the understanding and interpretation of the claims. I have also used the words "automobile" and "car" synonymously throughout the description.

In the drawings:

Fig. 4 is a plan view of one of the transport carriages.

Fig. 5 is a side elevational view in cross section of the transport carriage, taken along the line 5—5 of Fig. 4.

Fig. 6 is an enlarged end elevational view of the transport carriage taken along the line 6—6 of Fig. 4, some of the frame being broken away to show parts of the carriage driving mechanism.

Fig. 7 is plan view of one of the current collectors of the transport, together with the associated conductor rails.

Fig. 8 is a side elevational view of the collector and rails, taken along the line 8—8 of Fig. 4.

Fig. 9 is an enlarged view of the tipping motor limit switch.

Fig. 10 is a detailed view in elevation of the transport selector switch.

Fig. 11 is a horizontal cross-sectional view of this switch taken along the line 11—11 of Fig. 10.

Fig. 12 is a side elevational view of a stall assembly.

Fig. 13 is a plan view of a stall assembly.

Fig. 14 is an enlarged side elevational view of the automatic car stop shown in cross section, and taken along the line 14—14 of Fig. 13.

Fig. 15 is an end elevational view of the automatic car stop shown in Fig. 14 and with the car guide shown in cross section.

Fig. 16 is an end elevation showing in enlarged detail the car guide and the end support thereof as indicated by the line 16—16 of Fig. 12.

Fig. 17 is a view similar to Fig. 14, but of a modified form of automatic stop.

Fig. 18 is a side elevational view, partly in cross section, of one of the ticket boxes with the front cover removed.

Fig. 19 is a plan view in cross section of a portion of a ticket box, taken along the line 19—19 of Fig. 18.

Fig. 20 shows one of the ticket strips.

Fig. 21 is an end elevation of a ticket box taken in the direction of the arrow 21 of Fig. 18.

Fig. 22 is a cross-sectional view of a portion of the ticket box, taken along the line 22—22 of Fig. 18.

Fig. 23 is a diagrammatic end elevational view of a group of ticket boxes serving one bay.

Fig. 24 is a side elevation of a stall selector.

Fig. 25 is an elevational view in cross section taken along the line A—A of Fig. 24.

Fig. 26 is a horizontal sectional view taken along the line B—B of Fig. 24.

Fig. 27 is a fragmentary side elevational view of the selector panel.

Fig. 28 is an elevational view of the selector wheel and brush mounting, taken in the direction of the arrows C—C of Fig. 25.

Fig. 29 is a perspective view of one of the selector contact buttons.

Fig. 30 is an enlarged view of the selector driving mechanism.

Fig. 31 is a diagram of the electrical devices and electrical connections by which is controlled the parking and unparking sequence of operations in any one bay of stalls.

Fig. 32 is a diagram of the electrical devices and electrical connections by which the operation of the transport carriages is controlled.

Fig. 33 is a diagram of the electrical devices and electrical connections by which the operation of tilting mechanisms is controlled.

Fig. 34 is a diagram of the electrical devices and electrical connections by which the operation of the elevators is controlled.

Fig. 35 is a showing of the proper arrangement of the four wiring diagrams of Figs. 31, 32, 33, and 34.

*The building*

Figure 1:
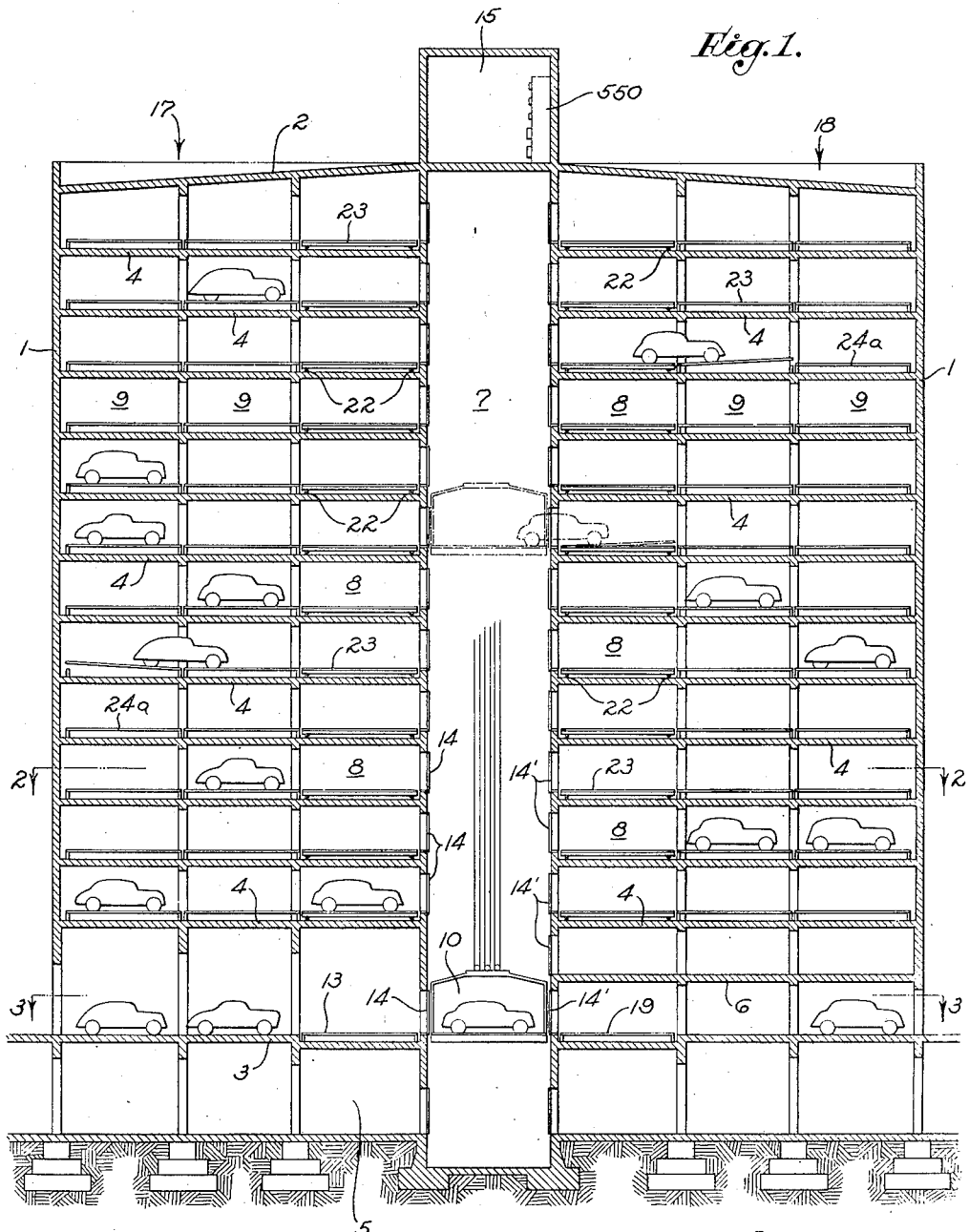
Fig. 1 is a cross-sectional elevational view of a building constructed and equipped in accordance with my invention.
Figure 2:
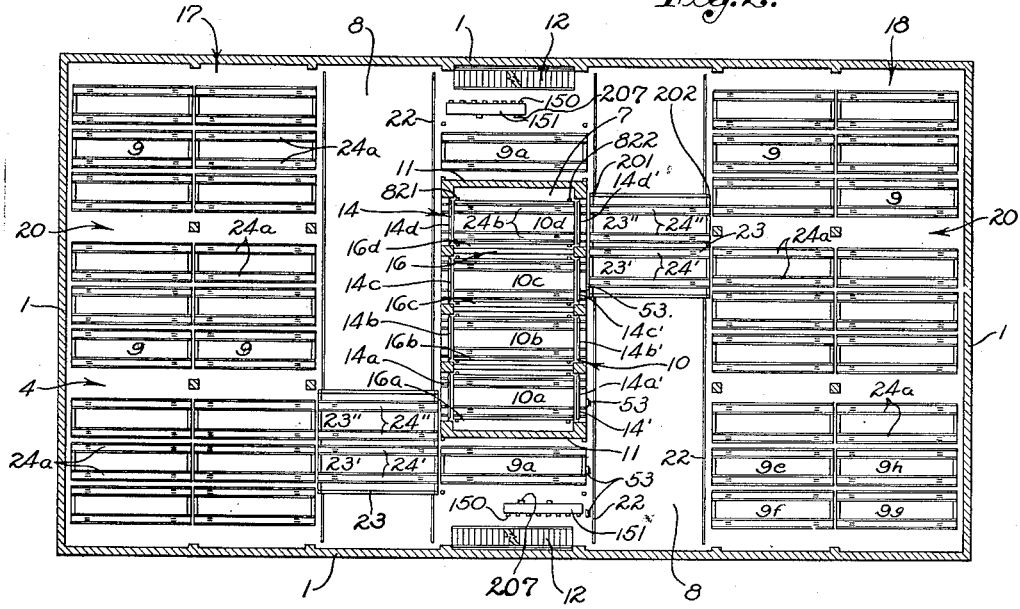
Fig. 2 is a plan view in section of the building taken along the line 2—2 of Fig. 1 and showing one of the upper floors.

Referring to Figs. 1 and 2, the building has walls 1, a roof 2, a ground floor 3, and upper floors 4 with vertical clearances sufficient to receive automobiles. Beneath the main floor is provided a basement 5 which may be arranged similarly to the upper floors for storage, or may be utilized for washing, service, or repair work. A mezzanine floor 6 may be included and arranged with a customers' lounge or for sales display of automobiles or automobile parts. These and other features of the building construction may be varied to suit the different requirements of each particular installation or the preferances of any particular proprietor, and are not necessary to the embodiment of my invention.

Above the first floor the building is divided vertically by an elevator shaft 7, with tiers of transport lanes 8 on either side thereof, and tiers of parking stalls 9. By reference to Fig. 2 of the drawings, it will be seen that the elevator shaft 7 is, in this instance, equipped with four elevators 10, designated as 10a, 10b, 10c, and 10d, each operating in an elevator hoistway 16, these hoistways being designated as 16a, 16b, 16c, and 16d, adapted to serve the basement, the main floor, the mezzanine floor, and all of the upper floors of the building. The hoistways are provided on each floor with hoistway doors 14, designated as 14a, 14b, 14c, and 14d, on the parking side 17 of the building, and with hoistway doors 14', designated as 14a', 14b', 14c', and 14d', on the unparking side 18 of the building. The space between the ends 11 of the elevator shaft 7 and the building walls 1 accommodates one or more parking stalls 9a, between which and the walls 1 are located stairways 12. Above the elevator shaft 7 may be constructed a penthouse 15 in which may be housed the control mechanism on a panel 550 for the operation of the elevators.

Each floor is provided with a group or bay 20 of stalls 9 on each side of the elevator shaft 7, between one of the transport lanes 8 and the front or rear walls 1 of the building. In the drawings, for the purpose of illustration, each bay contains eighteen such stalls 9. Also, for control purposes, the stall 9a between one end of the elevator shaft 7 and the building wall 1 on any one floor is associated with one of the groups of eighteen stalls 9 on that floor, making nineteen stalls to each bay. Each group of eighteen stalls 9 is arranged in two rows of nine each, transversely of the building, with each stall of the rear row in tandem alignment with a stall in front of it in the front row.

At each side of each of the two transport lanes 8 at each floor level 4 are track rails 22 upon which transport carriages 23 move transversely of the building. Each transport carriage is equipped preferably with two pairs of transport guides 24' and 24" hereinafter generally designated as transport guides 24, adapted and gauged to receive the wheels of and support two automobiles parallel to each other and relatively close together. Each carriage 23 is thus provided with two or more transport stations 23', 23". The transport guides 24 are similar and may be of any suitable form, but are shown in the drawings as channels or U-shaped rails of which the side walls are flared outwardly at one or both ends to facilitate the entrance of an automobile wheel. Each elevator 10 is equipped with a single pair of elevator guides 24b, and each stall 9 with a single pair of stall guides 24a similar in construction to the transport guides 24. The stalls 9 are preferably arranged in groups of three, in any one group of which the distance between the track centers of adjacent pairs of stall guides 24a is the same as that between the track centers of the two pairs of transport guides 24. Thus the transport guides 24 can be brought into simultaneous registry with the stall guides 24a. While the number of adjacent stalls 9 having a definite distance between track centers is subject to modification to conform to structural and other conditions, it is essential to one feature of this invention that there exist a relationship of the number of stalls at definite track center distances to the number of pairs of transport guides 24, as will be explained later.

Figure 3:
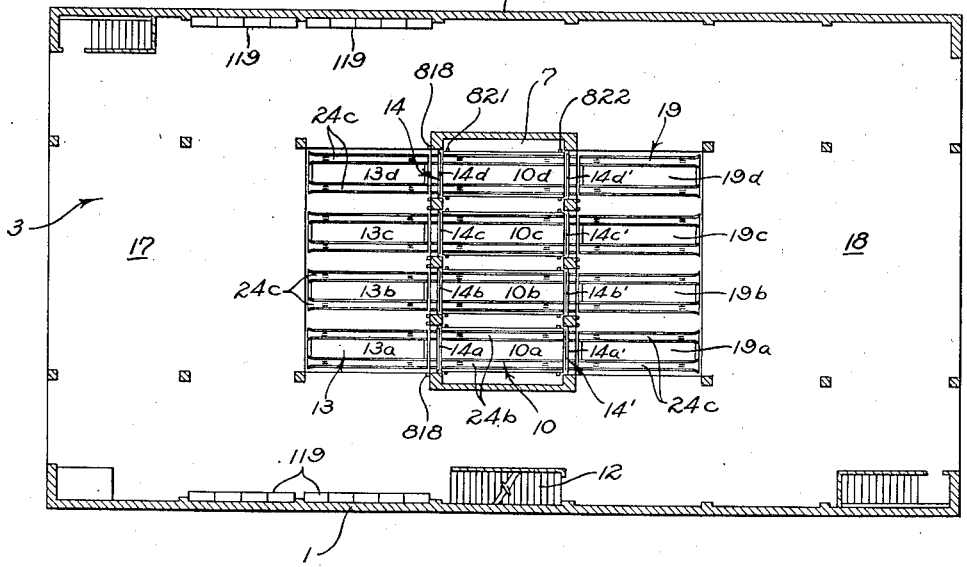
Fig. 3 is a similar plan view taken along the line 3—3 of Fig. 1 and showing the ground floor of the building.

As shown in Fig. 3, a plurality of receiving stations 13, designated as 13a, 13b, 13c, and 13d, are provided on the first floor 3 on the parking side 17 of the elevator shaft 7, each equipped with car wheel guides 24c of the same character as the transport guides 24, four such stations being shown. A receiving station 13 is aligned with each of the elevator hoistways 16 with its guides 24c in position to be in registry with the elevator guides 24b at times when the corresponding elevator 10 is at the first floor level. On the unparking side 18 of the elevator shaft 7, a plurality of delivery stations 19, designated as 19a, 19b, 19c, and 19d, one corresponding to each elevator hoistway 16, are provided to receive automobiles from the elevators 10, each of which delivery stations is equipped with wheel guides 24c in a manner similar to that of the receiving stations 13.

*The transport carriage*

The frame of each transport carriage 23 may be of any suitable construction. As shown in Figs. 4, 5, and 6 of the drawings, structural steel members are secured together to provide a horizontal frame which is made up of two end channels 26 and two pairs of longitudinally disposed channels 27 and 27a. Connecting each pair of channels 27 and 27a, and spaced midway between the end channels 26, are I-beams 28. Connecting each of the I-beams 28 with each end channel 26 are eight smaller channel members of which four outer ones are designated by the character 29 and four inner ones by the character 29a.

The carriage 23 is supported upon the track rails 22 by wheels 30, each mounted at a corner of the carriage upon an axle shaft 31 which is journaled at one end on one of the end channels 26 and at the other end on a frame element 32 which structurally connects one of the channels 27 and an adjacent outer smaller channel 29. The carriage is also supported by two drive wheels 30a which are mounted on the two ends of an axle 31a disposed parallel to the axle shafts 31 and spaced midway between them.

Each axle 31a is suitably journaled at its ends on the channel members 26 and is driven by a two-speed, three-phase alternating current propelling motor 33 mounted on a longitudinal channel 27a near one end of the axle 31a and operatively connected to the axle by suitable reduction spur gearing 34. Each motor 33 is equipped with an electromagnetic brake 33c of which the electromagnet when de-energized brings the motor to a stop, as is well known in the art.

*Tilting mechanism*

This parking system preferably includes the feature of movement of an automobile on its wheels by means other than its own power. I accomplish this result by constructing and arranging the pairs of transport guides 24, the elevator guides 24b, the stall guides 24a, and the car wheel guides 24c so that each of the pairs of guides may be elevated at either end so as to cause an automobile standing thereon to move toward the lower ends of the guides, and by providing a tilting mechanism for so elevating the guides. I utilize this tilting mechanism 21 at all stations, i. e., the receiving stations 13 on the ground floor 3, the elevators 10, the transport carriages 23, and the stalls 9, and the following description of the guides and tilting mechanism on the transport carriages applies also to the guides and tilting mechanism at the other stations.

Each of the transport guides 24 rests loosely at its ends upon the channels 26 and is prevented from longitudinal displacement by two pairs of depending fingers 35, each pair of fingers being rigidly secured to the under face of the transport guide at one end thereof and abutting the inner vertical face of the adjacent channel 26. Lateral displacement of the two outer transport guides 24 is prevented by the channels 29, each of which is disposed between a pair of the depending fingers 35. Lateral displacement of the two inner transport guides 24 is prevented by a similar engagement of each pair of depending fingers 35 with a lug 37 rigidly secured to the inner face of the adjacent end channel 26.

This arrangement of parts by which longitudinal and lateral displacement is prevented permits a limited movement of elevation of either end of the transport guides 24 without horizontal displacement, this elevation being accomplished at each end of a pair of guides by identically similar means. Two pairs of eccentric cams 38 are keyed or otherwise fixedly mounted in angular alignment upon a common cam shaft 39 which is journaled in suitable bearings 40 on the channels 29, 29a, and 27a. Each of the cams 38 contacts the under surface of the transport guides 24, and when the portion of the cam of shortest radius is disposed vertically upward, the guide is in horizontal position and both its ends are resting upon the end channels 26. When the cam 38 is rotated and the portions thereof of longer radius are moved into contact with the under face of the transport guide 24, the guide is elevated and the car thereon is rolled from the transport carriage 23.

The cam shaft 39 and the four cams 38 are rotated as a unit by a motor 41 mounted upon the carriage frame. The motion of the motor is communicated to the shaft 39 through a pinion 42 on the motor shaft and a spur gear 43 on the shaft 39. The supply of current to the motor 41 is controlled by a make-and-break limit switch 44a within a switch box 44, as shown in Fig. 9. The switch 44a is operated by an arm 45 equipped at its outer end with a contact roller 46. A contact pin 47 is mounted upon the lateral face of the gear 43 and extends therefrom parallel to the axis of the shaft 39. Referring to the left end of Fig. 5, when the motor 41 is energized by remote control mechanism to be hereinafter described, the spur gear 43, shaft 39, and cams 38 are rotated in a clockwise direction. The transport guides 24 are elevated at the left end, as shown in dotted lines on the drawings, until the cams 38 have rotated 180 degrees from their initial position. The car then leaves the carriage 23 by gravity. The motor 41 continues to actuate the tilting mechanism 21 and the cams 38 continue to rotate, lowering the transport guides 24 to a horizontal position. As the spur gear 43 nearly completes 360 degrees of revolution, the pin 47 engages the under side of the roller 46 and moves the upper arm 45 of a switch member 45a to the left, thereby causing the lower arm 45b to move to the right, opening the switch 44a in the switch box 44, which in turn operates the remote control mechanism to stop the motor. Momentum of the moving parts of the motor 41 and tilting mechanism carries the pin 47 out of contact with the roller 46, and a spring 48 pulls the arm 45b of the switch member 45a to the left to its initial position and recloses the switch 44a. The control mechanism has, however, in the meantime de-energized the motor, and a second revolution of the tilting mechanism becomes impossible until, at a later time, certain control conditions are again fulfilled, as will be described hereinafter.

Automatic stops 49 mounted on the channels 29 and 27a are constructed to permit a car to roll onto the transport carriage 23, and after it has been received thereon to prevent it from moving in either direction as long as the transport guides 24 remain in horizontal position. Similar stops 49 are provided at every station in the parking system and will be more fully explained in connection with a description of one of the stalls.

*Transport carriage motors*

I provide automatic switch mechanism to control the speed of the two-speed, three-phase motors 33 and to bring them to a stop. The pairs of motors 33 on any one transport are connected in parallel and are operated as one power unit. Two relatively thin cam blocks 50 and 50a are rigidly mounted on the outer side of one of the channels 26, and are shaped along their adjacent edges to form between them a cam groove 51. The cam groove 51 has a horizontal section 51a in the center of one level, a horizontal section 51b at the left end at a lower level, and a horizontal section 51c at the right end at a higher level than the center section, as shown in Fig. 6, and inclined sections 51' and 51'' connect the three horizontal sections in a continuous cam groove. An inclined section 51d slopes downwardly from the outer end of the horizontal section 51b, and an inclined section 51e slopes upwardly from the outer end of the horizontal section 51c. The cam groove 51 engages a cam follower 52 which is part of a transport selector switch 53, a plurality of which are rigidly mounted on the floor 4 adjacent the path of the moving transport carriage as shown in Fig. 2. Any one of the transport selector switches 53, in cooperation with the cam groove 51, and depending upon which one of the switches is set by the control mechanism as will be hereinafter described, is the means by which the motors 33 on the transport carriage 23 are caused to move at high or low speed or to come to a stop.

One of the transport selector switches 53 is shown in Figs. 10 and 11. A shallow, vertically disposed rectangular box frame 501, which is open at its ends, has vertically mounted within it an insulating switch panel 505. Upon the panel 505 are secured four pairs of resiliently mounted conductor contacts 506, 507, 508, and 509. The frame 501 is formed with a horizontally disposed cylindrical enlargement 510 midway vertically on one of its sides which serves as a bearing for a shaft 511. Rigidly secured to this shaft by a pin 512 is a hub 513 formed with a crank arm 514 at the outer end of which is revolubly mounted the cam follower or roller 52, which is adapted by its position to engage the cam groove 51 on the side of the transport carriage 23. The hub 513 is also formed with an integral arm 515 to which is bolted an insulating brush holder 516 which carries two brushes, i. e., an outer brush 517 adapted by its position to short-circuit either contacts 507 or contacts 509, and an inner brush 518 adapted by its position to short-circuit either contacts 506 or contacts 508. When in horizontal position, as shown in Fig. 10, the brushes 517 and 518 make no contacts, and no current can flow through the selector switch 53. The arrangement of parts is such that, when the brushes 517 and 518 are in their lowermost positions, as indicated by dotted lines 502, both contacts 506 and contacts 507 are short-circuited. When the brushes 517 and 518 are in intermediate positions, as indicated by dotted lines 503, only contacts 507 are short-circuited. A similar arrangement is provided for the upper pairs of contacts 508 and 509. The wiring of the contacts 506, 507, 508, and 509 will be set forth in the explanation of the wiring diagram shown in Fig. 32.

As the cam follower 52 engages the inclined section 51d of the cam groove 51 and then enters the horizontal section 51b, the arm 514 moves the brush holder 516 from its lowermost position 502 to its intermediate position 503, breaking contacts 506, while still maintaining electrical connection between the contacts 507. As will be later explained, this changes the connections of the motor 33 so as to change the motor speed from high to low. When the follower 52 engages the inclined portion 51' of the groove 51 and moves to the horizontal section 51a, the arm 514 assumes a horizontal position, and the motor 33 is disconnected and its brakes automatically applied.

The transport carriage 23 will move by all transport selector switches 53 which are not supplied with current by the control mechanism, and It is a feature of my transport control system to supply only one of these switches with current at any one time. As the transport carriage 23 moves by a deenergized switch 53, its follower 52 will reverse the arm 514 from lowermost to uppermost position or vice versa, which automatically sets it so that it may always be in position to control the transport carriage motors 33 should the switch be supplied with current at a later time, irrespective of the direction of approach of the carriage. When, however, the follower 52 comes to that switch 53 through which current is being supplied to the carriage motors 33, the follower will automatically, when the carriage 23 moves into position opposite such an energized switch, first reduce the motor speed to low, and then bring the motor to a stop. By this means I am able to stop the transport carriage 23 at any point so that its transport guides 24 may register with the stall guides 24a or the elevator guides 24b.

As shown in Figs. 7 and 8, current is supplied to the propelling motors 33, the tilting motors 41, and the tilting motor limit switches 44a by means of conductor rails 54 rigidly fixed upon the floor 4. Vertically yieldable contact brushes 55 are mounted in a brush holder 56 and are resiliently held in contact with the rails 54 by a standard arrangement of conductor clips 57 and spring members 58 on the brush holder. The brush holder 56 is suitably disposed upon one corner of the frame of the transport carriage 23. Conductors leading to the motors 33 and limit switches 44a are secured to the conductor clips 57. The wiring of motors and switches is shown diagrammatically in Figs. 31, 32, 33, and 34 of the drawings illustrating the electrical control features of this invention, and will be described later in that connection.

A photoelectric device 201 is mounted upon the transport carriage 23, with its light beam directed across the elevator end of the carriage at such an elevation that it will be intercepted by a car moving onto or off the carriage but will not be intercepted when a car is standing upon the carriage. Another photoelectric device 202 is similarly mounted upon the carriage with its light beam directed across the stall end of the carriage.

*Automatic car stops*

An assembly of the equipment and mechanism of one of the stalls 9 is shown in Figs. 12 to 17. A pair of stall guides 24a, spaced to receive an automobile, are supported loosely in horizontal position at either end on transverse rods 60 which are rigidly mounted upon standards 61 fastened to the floor 4. The stall guides 24a are prevented from lateral and longitudinal displacement, similarly to the transport guides 24, by depending fingers 35a rigidly secured to the under side of the stall guides. Two pairs of the fingers 35a are arranged at each end of a stall guide 24a, each pair embracing the rod 60, and two pairs disposed on either side of a collar 62, as shown in Fig. 16. Sets of eccentric cams 38 and associated operating mechanism are arranged to elevate each end of the two stall guides 24a of the stall 9, and are similar to the tilting mechanism already described as part of the equipment of a transport carriage 23. The fingers 35a are preferably, although not necessarily, of sufficient length to engage the rod 60 at such times when the end of the guide to which they are secured is in its uppermost position of elevation, thereby assuring the return of the guide to its proper position.

Automatic stops 49 are provided in conjunction with the stall guides 24a to halt and retain a car in parked position in the stall 9 when the guides are in a horizontal position, and permit movement of the car from the stall when the guides are elevated at either end, so as to cause them to assume an inclined position in either direction, and are similar to stops 49 provided on the transport carriage 23, on the elevators 10, and at the receiving stations 13, and the following description of these stall stops will apply as well to the stops at all other stations of the parking system.

One of the stops 49 is shown in detail in Figs. 14 and 15. A weighted base 63 is formed with two upwardly extending arms 64 and a hub 65 disposed between the arms and near their lower ends. While this is a preferable construction, one arm or more than two arms may conceivably be used with the same result. The stop 49 is pivotally mounted upon a rod 66, upon which the hub 65 is sleeved, the rod being supported in horizontal position between two pedestals 67 of a base 68 which is suitably secured to the floor 4 at a point near one end of the stall guide 24a. The distance between the stops 49 at either end of a car guide is somewhat greater than the wheel base of an automobile.

The arms 64 project upwardly through slots 69 in the stall guides 24a, and each arm is provided at its upper end with a contact roller 70 at a proper distance vertically above the stall guide when the latter is in its horizontal position to clear an automobile bumper and to engage an automobile wheel somewhat below the horizontal plane of the wheel axis.

The hub 65 is integrally formed with an upwardly disposed lug to provide a catch 71 which abuts a catch block 72 rigidly secured to the under surface of the stall guide 24a between the catch 71 and the adjacent end of the stall guide. The vertical extent of the contacting faces of the catch 71 and the catch block 72 is such that when the distant end of the stall guide 24a is elevated about the adjacent end as a center of rotation, the catch block on the guide will clear the catch 71 on the hub 65.

When a car enters, from the left, the stall 9 shown in Fig. 12, the left end stops 49 will be depressed to the right by the car wheels, allowing the car to take a central position between the ends of the stall guides 24a. When, as the car continues its movement, its forward wheels contact the right-hand stops 49a, the catch blocks 72a will prevent depression of the stops 49a, and the car will be halted. In the meantime, the weighted bases of the stops 49 will have restored the stops 49 to their vertical position, and if there is any rebound movement of the car toward the left end stops, the interaction of the catch 71 and catch block 72 of the left end stops will prevent depression of the arms 64 to the left and halt the car.

If, however, the right ends of the stall guides 24a are elevated by operation of the tilting mechanism at that end, the catch 72 at the left end of the guide is elevated to clear the catch 71. When the car starts to the left down the inclined guides under the action of gravity, the adjacent car wheels press against the stops 49 which are free to rotate downwardly on their pivoted mountings on the rod 66. Each pair of car wheels then successively passes over the stops 49, which afterward return to vertical position under the action of the weighted bases 63. When the tilting mechanism restores the stall guides 24a to their horizontal positions, the stops 49 are again in condition to receive and hold stationary another car. It will be observed that the stop mechanism functions with equal effectiveness irrespective of the end at which a car enters the stall or any other station of the system, and irrespective of the end from which it is rolled out of the stall or station.

Fig. 17 shows a modified form of car stop 49' in which a tread plate 73 is pivotally connected to the upper end of an arm 64' and extends therefrom at a preferably relatively small angle of inclination to the horizontal to the central tread portion 24" of the stall guide 24a, its lower end sliding horizontally along the guide as the stop 49' oscillates in either direction from the vertical. The upper face of the plate 73 engages the wheel of an oncoming car, and its angle of inclination is designed to decelerate the car to a stop more gradually than would be the case were it not used. When, however, the appropriate catch block 72 allows it, the plate 73 will move to the left with the stop arm 49 and assume a horizontal position permitting the car wheels to pass over it. When the stop 49' moves to the right, the plate 73 will be moved in advance of it to a horizontal position and, as before, permit passage over it of the car wheels.

As has been before stated, the tilting mechanism and the car stop devices are common to all stations. There are necessary, however, in the different stations some slight modifications of the details of their support, which in no way affect their general character or the principles upon which they operate.

Car handling sequences

An automobile storage building constructed and arranged as described up to this point, with receiving stations 13, elevators 10, transport carriages 23, and stalls 9 arranged as described, may be used to park cars operated under their own power, and certain features of my invention are utilizable irrespective of the character of the means of car locomotion. Furthermore, there reside in the tilting mechanism the car stops 49 in their combination, and in the combination of these two devices with other devices and arrangements of my storage system, certain features of invention which are utilizable irrespective of whether the tilting mechanism is manually operated or power operated, and irrespective of the type of power used to operate it.

I prefer to use electric power in the operation of this parking system. The elevators 10 and transport carriages 23 are equipped with electric motors for their locomotion, and the tilting mechanisms at all stations are also operated by electric motors 41. I also use electric power to operate a control system for the motors 41 to carry out the several successive operations of parking or unparking a car in proper sequence, to prevent interference in the use of the elevators 10, transport carriages 23, and tilting mechanisms, and to signal the operator the condition of a car or of any part or group of parts of the equipment.

Before describing the control and signal system, I will describe the sequence of steps in parking and unparking a car into and out of typical stall locations.

When a car enters the building, it is driven onto one of the receiving stations 13, and a claim check is given the driver by the operator. The corresponding elevator 10 is brought to the ground floor 3, if not already there, and the car is moved onto the elevator and is carried in the elevator to one of the floors 4, and a transport carriage 23 moved into such position that one of its pairs of transport guides 24 is in registry with the elevator guides 24b. The car is then moved from the elevator 10 to the transport carriage 23, which is then propelled transversely into such position that the transport guides 24 supporting the automobile are in registry with the stall guides 24a of that pair of empty stalls 9, one in front of the other, into one of which it is desired to park the car. The car is then moved from the carriage 23 to the stall 9, completing the parking operation. The sequence of steps of the reverse operation of unparking, by which the car is taken to one of the delivery stations 19, is apparent.

When there is already a car in the rear one of a pair of stalls 9 arranged in tandem, one in front of the other, there is no difficulty in parking a car in the empty front stall in the manner just outlined. However, if there is a car in the stall 9e (see lower right-hand corner of Fig. 2), and it is desired to park a car in stall 9h behind it, the following sequence of steps becomes necessary. The transport carriage 23 is moved until its station 23" is in registry with stall 9e, and the car in stall 9e is moved onto station 23". The newly received car is brought up in one of the elevators 10, and the transport carriage 23 is moved so that the station 23' is in registry with the elevator hoistway 16c. The newly received car is then moved onto station 23' and carried on the transport carriage 23 until it is opposite stall 9e, and the newly received car is then rolled into stall 9e and on back into stall 9h. The carriage 23 is shifted to bring station 23" into registry with stall 9e, and the first car is returned to the position in stall 9e from which it was temporarily removed. The unparking operation reverses these steps.

There is, however, a more difficult set of conditions which must at times be met. Assuming that there are cars in both stalls 9e and 9f, and it is desired to park a later received car in stall 9g in the extreme corner of the building, the problem becomes that of getting the car into stall 9g and returning the car in stall 9f to its initial position, to the end that there may be no confusion in delivering cars when called for. It is, of course, obvious that it is necessary in an automatic control system in which a car can only be identified by its known position when wanted for delivery at the end of the parking period, to return an interfering car to its initial position after temporary removal to give access to the rear stall. To meet this set of conditions, the parking steps are carried out as follows. The transport carriage 23 is moved to a position in which its station 23' registers with stall 9f and station 23" registers with stall 9e. (The observer is assumed to be standing at the elevator shaft and looking across the transport lane in identifying the directions "right" and "left.") Both cars in the stalls 9e and 9f are rolled onto the registering transport guides 24, and the carriage 23 is moved transversely until the station 23' registers with the stall 9e. The car on the station 23' is moved into the stall 9e, and the transport carriage 23 is then moved to one of the elevators 10 with the station 23' in registry with the elevator guides 24b, where it receives the incoming car from the elevator. The transport carriage 23 is then moved transversely until its station 23' registers with the stall 9b, and the newly received car is rolled from the station 23' through the stall 9f and into the stall 9g. It only remains to shift the transport carriage 23 until the station 23' registers with the stall 9e, to roll the car in the stall 9e onto the station 23', to return the transport carriage to the position in which the station 23' registers with the stall 9f, and to roll both cars positioned on the transport into the stalls 9e and 9f respectively. This completes the parking operation and leaves both previously parked cars in their original locations. The unparking operation reverses these steps. It will be observed that this long sequence of steps is made necessary because the transport carriage 23, due to the proximity of the adjacent building wall 1, cannot move into a position such that its station 23' will register with the stall 9f to remove the interfering car parked in that stall. It will also be observed that parking and unparking sequences of the kind just described require the provision of at least as many parallel car stations on the transport carriage as there are stalls in tandem arrangement in the parking bays. Two such stalls, one in front of the other, and two parallel car stations on the transport are shown in the particular exemplification of my invention shown in the drawings. If three or more tandem stalls are arranged in the bays, three or more car stations must be provided on the transport carriage, and the sequence of steps, while longer, is similar to that described for a two-stall plan and can be readily worked out.

I utilize electric energy in the operation of my parking system for three purposes: (1) by means of electric motors to actuate the moving parts of the system; (2) to control the supply of power to these motors and determine the sequence of their energization; and (3) to indicate by appropriate signals the condition of the system and the positions of the automobiles at various times. I have already described the elevators as electrically operated, and have referred to the transport carriage propelling motors 33 and tilting mechanism motors 41, and I have described typical sequences of operative steps which require the actuation of these motors. To avoid confusion and afford simplicity in keeping the storage records, it is desirable to park a car in a predetermined stall 9 with a known designation, to maintain that car in its stall during the period of parking, and to reclaim it from that stall to a delivery station 19 in the unparking operation. The control mechanism is designed to automatically accomplish this objective.

Ticket dispensers

I provide ticket dispensers 74 at some convenient location on the ground floor 3, one of these dispensers being provided for each one of the storage stalls 9 of the building and associated with and individual to that stall only. As will be seen from the following description, each of these dispensers is constructed to serve as a switch for the operation of a control system individual to that dispenser which selectively energizes the several car moving devices to move a car to or from the stall individual to that dispenser. As will also be seen from the description of the dispenser, it is provided with a switch operated by the withdrawal of a ticket from the dispenser and with a manually operated switch connected in parallel with the ticket operated switch. I do not wish to be limited to the use of a ticket operated switch in the use of my invention.

Referring to Figs. 18 to 23, each of the ticket dispensers 74 includes a generally rectangular ticket box 75 of any suitable material divided longitudinally by a transverse vertical partition panel 76 into two compartments, a magazine 77 and a switch chamber 78. The box 75 is open at one side which is provided with a removable cover 85. A ticket strip 79 of cardboard or similar dielectric material and made with perforated cross lines 80 between each two parking tickets is placed in the magazine with the tickets folded back and forth, one upon the other, along the perforated lines 80, in a compact pile 81 having the horizontal width of a single ticket. The horizontal dimensions of the magazine 77 are such as to snugly receive and accommodate the ticket strip 79.

An insulating plate 82 is mounted transversely of the switch chamber 78 in an inclined position, being secured near its upper inner edge 83 by screws 84 to a boss 86 formed on the under face of the top wall of the box 75, and being secured near its lower outer edge 87 by screws 88 to a boss 89 formed in proper position on the front wall of the ticket box. To the under face of the insulating plate 82 is secured by screws 90 and 90a a conductor plate 91 of copper or other current conducting material, the screw 90a being arranged as a terminal for a wire 92.

The partition panel 76 is of current insulating material and serves as a supporting panel for conductor brackets 93 and 94, the brackets being secured to the panel by screws 95 and 96, respectively, which screws are arranged to serve also as terminals for wires 97 and 98 respectively. The brackets 93 and 94 are so positioned upon the panel 76 as to be laterally offset with respect to each other. Conductor fingers 99 and 100 are resiliently mounted at the outer ends of the brackets 94 and 93, respectively, by means of pins 101 surrounded by concentric helical springs 102 by which contact terminals 99' and 100' of the fingers are maintained in sliding contact with the conductor plate 91. The contact 99' contacts the forward portion of the plate 91, and the contact 100' contacts its rear portion.

An upper cross bar 103, mounted rigidly within the box 75, is the upper support for the panel 76, and its upper edge is formed with a horizontally projecting lip 104 extending within the switch chamber 78, and a rounded corner 105. The rounded corner 105, in conjunction with the rear portion of the plate 82, affords a guideway for the receipt of the ticket strip 79, which is threaded between the conductor plate 91 and the conductor fingers 99 and 100 and through a slot 106 in the front wall of the ticket box 75. The forward end of the ticket strip 79 rests upon two tongues 107 formed upon the front wall of the box 75 and at each side of the slot 106. The extreme outer edge of the ticket strip 79 abuts two limit stops 108 and 108a formed at the lower outer edge of these tongues, respectively.

Each ticket in the ticket strip 79 is made with transverse lines of perforations 109 and 110, with a rectangular cut-away indentation 111 on the right portion of one of its end edges and a similar cut-away indentation 112 in the right portion of its other end edge, and with a rectangular aperture 113 disposed in the left-hand portion of the ticket and in such a position longitudinally of the ticket as to be bisected by the perforations 110. The indentation 111 of one ticket forms with the indentation 112 of the ticket next in advance a rectangular slot similar to the slot 113 but on the other side of the longitudinal central line of the ticket. That portion 114 of the ticket extending from the perforated line 80 back to the line 110 is of one color, for example blue, and the remaining portion 115 of the ticket is of another color, for example red. When the blue portion projects from the box 75 and rests upon the tongues 107, it indicates to the operator that the stall 9 controlled by that ticket dispenser 74 is empty. When the red portion projects from the box 75, it indicates that the particular stall 9 is occupied by an automobile. Both portions of all the tickets of any one ticket strip 79 have marked thereon the number of the stall 9 to which that particular box corresponds. Reference has been made to the two limit stops 108 and 108a at the outer end of the tongues 107, the stop 108 being disposed in the right-hand portion of the pathway of the ticket strip 79 and being arranged to abut the ticket within the indentation 111 and thus serve to definitely hold the ticket in one position longitudinally within the box. The other limit stop 108a is disposed in the left-hand portion of the pathway of the ticket strip and is arranged to abut the ticket within the aperture 113 and serve to definitely hold the ticket in another longitudinal position.

To explain the operation of the ticket dispenser 74, let it be assumed that the blue portion of a ticket in projecting from the box 75 and the right-hand stop 108 is engaging the indentation 111 of the ticket. Under this condition the finger 100 is in electrical contact with the conductor plate 91 through the aperture 113 of the ticket, which is the connection for carrying out that sequence of operations by which the last car occupying that stall 9 had been unparked, i. e., reclaimed from its storage stall. No current now flows through this connection, due to a control feature which will be explained in due course. A car is placed upon one of the receiving stations 13. The ticket is grasped by the operator and pulled from the box until the left-hand stop 108a engages the aperture 113, and the blue portion 114 of the ticket is torn off along the perforated line 110. The blue portion 114 is divided along the perforated line 109. The forward part 114a of this blue portion is given to the customer to serve as a claim check, and the rear part 114b is placed on the windshield or in some other convenient position on the automobile. The ticket strip has now electrically separated the finger 100 from the contact plate 91 and has established contact between the finger 99 and the contact plate through the aperture 111—112, which completes a circuit by way of conductors 92 and 98 to an element in the control mechanism which starts in motion the sequence of operations arranged to take the car from the receiving station 13 to the stall 9 bearing the same number as the number on an identification plate 116 in the front wall of the ticket box 75. The red portion 115 of the ticket now projects from the box. When it is desired to unpark the car from the stall 9, the ticket is again grasped and pulled until the aperture 111—112 registers with the right-hand stop 108, which breaks the parking contact of the finger 99 with the conductor plate and makes electrical connection by way of the finger 100, which sets in motion the train of operations to unpark the car and bring it to one of the delivery stations 19.

I incorporate in the ticket dispenser 74 the optional and preferred additional feature of two manually operated switches 117 mounted at any suitable position within the box 75, which switches are wired in parallel to the fingers 99 and 100 respectively and serve to permit manual initiation of the parking or unparking cycle of operations respectively. They are distinguished from each other by the use of different colored switch handles 118 or other suitable indicating marks. Preferably the ticket dispensers 74 corresponding to the stalls 9 of any one bay are mounted in group form, as shown in Fig. 23, on a rack 119 with a vertical back wall 120. I arrange three-point terminal plugs 121 on this back wall, each point of each plug being adapted to register and make electrical contact with one of three terminals 122 disposed upon the rear wall of a corresponding ticket dispenser 74. Conductor wires 92, 97, and 98 leading from the conductor plate 91 and fingers 99 and 100 respectively are connected to these three terminals respectively, with their intervening portions conveniently disposed in a slot 123.

Each ticket dispenser 74 is loosely supported upon the rack 119 and may be bodily moved thereon so as to electrically disengage or re-engage the terminals 122 from or with its associated terminal plug 121. When it is desired for any reason to temporarily render any ticket dispenser 74 inoperative as an electrical control agency, this may readily be accomplished by simply moving that ticket dispenser 74 forward on the rack a short distance. Return of the dispenser 74 to its proper position places it again in position to function as a control agency. When several cars await entrance to an occupied receiving station 13, each of the car drivers may be given his claim check. The dispenser 74 from which it is extracted, however, may be disconnected, electrically, until the corresponding car is moved into position on the proper receiving station 13. Otherwise, the train of parking operations for any certain stall 9 might be set in operation before the car for that stall is in position on the receiving station, and the various functional steps be performed idly, which is undesirable.

Each group of ticket dispensers 74 which control all the stalls 9 in one bay is surrounded by two neon lights 124 and 125 of different colors, red and blue for example (see Fig. 23), or equipped with other appropriate signalling devices, for purposes to be explained later.

Each ticket dispenser 74 is also provided with an electric lamp 126 arranged to throw light rays through a transparent window glass 127 and connected in an electric circuit to be explained later.

Stall selectors

Each ticket dispenser 74 is electrically connected to a corresponding stall selector 150, shown in Fig. 24, which, like its ticket dispenser 74, is associated with and individual to one certain stall 9 only. The selectors 150 are mounted upon control panels 151 which are conveniently located on the various building floors 4, one in each bay of stalls 9 (see Fig. 2). Upon each of the panels 151 are mounted as many selectors 150 as there are stalls 9 in the bay. A selector 150, when set in operation by one of the switches in its ticket dispenser 74 on the ground floor 3, makes in proper sequence the electrical connections to actuate the several power operated devices for parking or unparking a car. Referring to Figs. 24 to 30, I have shown a selector 150 of a preferred design, having a selector frame 155 which is preferably an integral casting comprised of a base 156, end uprights 157, a cross bar 158 which is enlarged at its central portion to form a hub 154, and two horizontal arms 159 extending inwardly and perpendicular to the cross bar 158. A selector wheel 152 is rotatably mounted upon a stationary shaft 153 which is fixedly mounted in horizontal position in the enlarged hub 154. A stationary circular panel 160 made of non-conducting material is secured in an upright position to the inner edge of the base 156 and the inner ends of the arms 159 with its inner face 161 in proximity to the inner adjacent face 162 of an insulating revolving plate 163 which is secured by screws 164 to the inner face of the wheel 152. The panel 160 is the support for stationary electrical contacts arranged in seven concentric circles of which some are unbroken rings, some consist of arc segments, and some consist of series of short contacts or contact buttons. Beginning at the center of the panel, the first contact is an unbroken contact ring 165, best shown in Figs. 25 and 27. In the second circle are two short contacts 136 and 166 disposed 180 degrees apart and on a diameter at a small angle to the horizontal. In the third circle are two segment contacts 137 and 167, each nearly 180 degrees long and separated from each other by small gaps on the horizontal diameter of the panel. In the fourth circle are found two short segment contacts 138 and 168 and two long segment contacts 139 and 169, the segment contacts 138 and 139 occupying one-half of this circle and the segment contacts 168 and 169 occupying the other half of this circle. A slight gap separates each two adjacent segments. Two of the gaps are 180 degrees apart and on the horizontal diameter of the panel, and the other two gaps are disposed on a common diameter at an angle to the horizontal, slightly less than the angle of inclination to the horizontal of the diameter passing through the contacts 136 and 166. In the fifth circle are a large number of short contacts or contact buttons 170, one of which is shown in Fig. 29. The contacts 138, 139, 168, 169, and 170 in the sixth and seventh circles are identically similar to the same numbered contacts in the fourth and fifth circles respectively in the angular relationship of their parts, except that the short contacts 170 of the seventh circle are disposed on radial lines staggered with respect to the radial lines of the contacts of the fifth circle. These contacts in the sixth and seventh circles are as a group functionally identical with those in the fourth and fifth circles respectively, and to avoid confusion in their diagrammatic representation in Figs. 31, 32, 33, and 34 of the drawings showing the wiring diagrams, they are designated by the same reference characters as those of the fourth and fifth circles. The two segments 138 in the fourth and sixth circles, respectively, are electrically connected, as also are the two segments 168, the two segments 139, and the two segments 169.

On the revolving plate 163 are carried the brushes which coact with the stationary contacts on the panel 160, being seven in number, one for each of the circles of contacts, and being designated in the drawings as 171, 172, 173, 174, 175, 140, and 141. The brushes 171, 172, and 173 are electrically connected by a yoke 176 by which they are secured to the plate 163, and the brushes 174 and 175 are similarly connected electrically by suitable yokes, as also are the brushes 140 and 141. The brushes 171, 172, and 173 constitute together a single shorting brush, and the brushes 174 and 175 and the brushes 140 and 141 similarly constitute two additional shorting brushes.

Every contact on the panel 160 is provided with a terminal 177 on the back of the panel, from which conductors 178 lead to various electrical devices of the system, as will be hereinafter set forth.

The brush holding selector wheel 152 is driven by a double-acting ratchet mechanism. A ratchet wheel 180 is secured to the wheel 152 by means of screws 181 and is formed with two sets of teeth 182 and 182a of the same pitch, the teeth and intermediate notches of one set being stepped half the pitch ahead of the teeth and notches of the other set, and each set occupying one-half the face of the wheel. The ratchet wheel 180 is intermittently actuated by a solenoid 183 mounted, with its axis horizontal, on a standard 184 which is rigidly bolted to the arm 159 so as to extend vertically upward therefrom. An armature 191 for the solenoid 183 is pivoted to the standard 184 in position to depend vertically from its axis and to swing in a vertical plane toward and away from the solenoid core. A vertically disposed frame plate 185, secured to the standard 184 and extending inwardly therefrom and beneath the solenoid 183, supports pivotally near its inner end a link 186 with the pivot axis horizontal and midway of the ends of the link. At its upper end the link 186 is pivotally connected to the inner end of an upper leg 187 of a bifurcated, horizontally disposed and horizontally reciprocable link 188. The link 188 is formed with a horizontal shank 189 and the upper leg 187 and a lower leg 187a disposed in vertical planes offset upon either side, respectively, from the vertical plane of the shank 189. The link 188 is pivotally connected at the end of its shank 189 to a tongue 190 integrally formed on the lower end of the armature 191. A horizontal pawl 192a is pivoted to the lower end of the link 186 on a horizontal axis and is held by gravity in operative engagement with the ratchet teeth 182a. A second horizontal pawl 192 is pivoted on a horizontal axis to the link 186 at the end of its lower leg 187a and is held by gravity in operative engagement with the ratchet teeth 182, and with that particular tooth next ahead of the tooth engaged by the pawl 192.

When the solenoid 183 is energized, the armature 191 is moved to the left, a movement which is imparted to the link 188 and pawl 192 and causes a movement of rotation of the wheel 152 in a counterclockwise direction. Simultaneously the pawl 192a is being moved to the right by the link 186, which causes it to be lifted from its mating notch and moved until it meets a stop 193 secured to the inner end portion of the frame plate 185. The parts of the mechanism are so proportioned that the pawl 192a drops into the next notch of the ratchet teeth 182a just as it abuts the stop 193. This arrangement and design serve to limit the action of the solenoid 183 upon the wheel 152 to a definite movement of rotation of an angular magnitude equal to one-half the angle between two adjacent contact buttons 170, one of which is in the fifth contact circle and one of which is in the seventh contact circle on the panel 160.

When the solenoid 183 is de-energized, the link 188 with all its associated parts is pulled to the right by a spring 194 attached at one end to the link 188 and at its other end to the frame plate 185. This movement to the right is reversed by the link 186, which moves the pawl 192a to the left and imparts to the wheel 152 a counter-clockwise movement of the same angle as before, being limited by the right-hand movement of the pawl 192 as it rides out of its mating notch and comes to a halt against the stop 193 and drops into its next mating notch to the right. The mechanism is so arranged that when the solenoid 183 is energized, the wheel 152 is moved by the pawl 192 into such position that one or the other of the shorting brushes 141 or 175 is in contact with a contact button 170; and when the coil is de-energized, the wheel 152 is moved into such a position that neither of these shorting brushes is in contact with a contact button 170 but is angularly midway between two of them.

The flow of current to the solenoid 183 is controlled at certain times and under certain conditions, as will be explained later, by a lagged contact switch 195 mounted upon the frame plate 185. As shown in the drawings, the switch 195 takes the form of a horizontally pivoted, mercury-filled cup 196 which is made of non-conducting material and which is rocked to and fro from one position to another by the lower tip of the armature tongue 190, the tongue pressing alternately against faces 197 and 197a of the cup. In one position of the cup 196, the terminals within it of conductors 198 and 199 are bathed in mercury, which affords a closed path for electric current to the solenoid 183, by a wiring arrangement to be presently described. In the other position no current can flow through the cup.

The arrangement of ratchet wheel 180, pawls 192 and 192a and linkage which has been described enables a single solenoid 183 to impart a movement of rotation through a definite predetermined small angle to the selector wheel 152, either upon its being energized or upon its being de-energized, and in either case the wheel is automatically locked in position against any accidental movement. It will also be observed that the selector wheel 152 is always rotated in the same direction. The contacts on one semi-circular half of the stationary panel 160 of the selector 152 are all related to control of the operations by which an automobile is taken from a receiving station and parked in one of the stalls 9. The contacts on the other half of the panel 160 are all related to control of the unparking operations. Throughout the drawings the parking contacts are shown on the upper semi-circular half, and the unparking contacts on the lower semi-circular half of the selector panel 160, or any diagrammatic representation of it. It is apparent that since the selector wheel 152 carrying the brushes can move in only one direction of rotation, it is necessary to complete a parking sequence of operations before an unparking sequence can be initiated for that stall, and vice versa.

Operation sequence control

It will be observed that one transport carriage 23, and only one, serves the nineteen stalls 9 of any one bay. It is then obvious that only one operation, whether of parking or of unparking a car to or from the stalls of that bay, can be carried on at any one time. The transport carriage 23 then is the speed limiting factor of each bay. However, the system must be so designed that customers may be waited upon rapidly and given their claim checks upon receipt of their cars for parking, or given their cars when called for, in as short a time as possible.

Accordingly, after a ticket has been withdrawn from a ticket dispenser 74 of a stall 9 in any one bay, it is desirable that the operator may be able to withdraw one or more tickets from other ticket boxes of the group serving that bay, before the sequence of car moving operations initiated by the withdrawal of the first ticket of that bay has been completed. This may be accomplished in the event of an unusual rush of incoming cars and in so far as several parking operations are concerned by sliding forward all but the first ticket box 74, thereby electrically disconnecting the boxes from the control mechanism. To readily notify the operator that an uncompleted parking or unparking operation is proceeding, there is placed adjacent each group of ticket boxes a neon or other suitable warning signal 124 which is caused to be illuminated as soon as said parking or unparking operation begins. The description of the wiring diagram will explain how this is effected. As long as the neon sign 124 is illuminated, the operator will slide forward each ticket box 74 from which he subsequently withdraws a ticket, and when the neon sign darkens, he will return to position any one of the displaced boxes, which will again illuminate the neon sign.

It is desirable, however, that several unparking tickets relating to any one bay be withdrawn, in rapid succession, and that the process of unparking each car be begun immediately upon the completion of the operation of unparking the next preceding car, from a stall 9 of that bay. To accomplish this, I provide automatic control means which will prevent interference between unparking of cars from several stalls in any one bay. To provide also for interference between parking operations, I utilize this same automatic control means. It is also arranged to prevent interference between parking and unparking operations relating to the stalls 9 of any one bay, and serves to hold in abeyance all but one of the stall control circuits which may have been connected by ticket withdrawals, and to release for action such withheld control circuits in the order of the withdrawals of both parking and unparking tickets indiscriminately. It will be remembered that interference between the parking and unparking operations of any one stall is prevented by the use of a single master selector 150 for each stall 9, which always rotates in the same direction and which is provided with two semi-circular contact rings disposed in the same circle and electrically insulated from each other, one for controlling the parking operation and one for controlling the unparking operation of a car to or from that stall.

Fig. 31 shows diagrammatically the selectors 150 related to the stalls 9 in any one bay, together with the devices for preventing interference in the operations of parking and unparking cars to and from those stalls, and together with the signalling and safety devices, and the electrical connections of the wheels and devices. For the sake of simplicity and clarity, I have shown only three such selectors 150, but it will be understood that in an actual installation there will be as many selectors as there are stalls 9 in that bay. The building shown in the drawings is provided with nineteen stalls 9 in a bay, and each such bay would be provided with nineteen selectors 150, each connected with an associated ticket box 74 on the ground floor 3. I have also shown devices for permitting the withdrawal of four tickets and the consequent establishment of connections for four car handlings to and from the stalls 9 of that bay, which devices will, however, hold in abeyance three of the car handling operations until the first operation is completed. It will be understood that these devices can be designed to afford non-interference for any number of operations up to the total number of desired contemporaneous calls for operations in any one bay. By the use of the principle of this non-interference feature of my invention, non-interference can be afforded for any number of operations from two to nineteen, at the discretion of the designer of the installation and depending upon the conditions which will obtain in any one particular installation. In Fig. 31 I have shown for simplicity a non-interference layout which will care for contemporaneous closings of four ticket box switches, all serving stalls 9 in any one bay, and will cause each car handling to follow the completion of the last car handling in the order of the closing of the ticket box switches. It will be understood that there is no significant relationship between the number of stall selectors 150 shown, i. e., three, and the number of car handlings which the non-interference devices are designed to handle, i. e., four, except that obviously the latter number in an actual installation should not exceed the number of stalls 9. In each case the number chosen is for illustrative purposes only, and is determined by the wish to make the diagram as simple as possible and yet have it fully illustrate the principles involved. If there are nineteen stalls in a bay, it is probable that the non-interference devices should be designed to take care of approximately seven car handling calls, whereby, while one car handling operation is being carried on, six others will be automatically held in abeyance and automatically and successively initiated in the order in which the calls were set up on the ticket boxes by the operator. This assumes that seven is the probable number of calls that usually might have to be set up contemporaneously in any one bay to satisfactorily serve the customers. To warn the operator against setting up more than the number of calls which the system is designed to handle, when that number of calls have been set up, a second neon light 125 installed adjacent the ticket boxes of any one bay is automatically illuminated, as will be presently more fully explained. As shown in Fig. 31 of the drawings, it will illuminate when four calls have been set up and darken in case of any lesser number of calls. In an installation wherein the bays comprise nineteen stalls and the non-interference feature of the system is designed to care for seven calls, the neon light 125 will remain dark until there exist simultaneously seven incomplete calls, to but one of which seven calls, it will be understood, operative response is being made, and of which seven calls the remaining six are being held in abeyance.

Figs. 31, 32, 33, and 34 show diagrammatically the electrical devices and their wiring by which I control the automatic parking or unparking of cars to and from the stalls 9 on the several floors 4 of the building. Some of the wires are shown on two or more of the figures, but in such cases each such wire is given the same designating character throughout, and where it leaves the sheet of the drawings whereon appears any one of these four figures, an arrow indicates that it is connected to a continuation of that same wire on another sheet of the drawings. Fig. 35 shows the arrangement of Figs. 31, 32, 33, and 34 for a proper understanding of such interconnecting wires between the several wiring diagrams.

In Fig. 31 of the drawings, three stall selectors 150 are shown diagrammatically and designated 150a, 150b, and 150c. The stationary panels 160 of these three stall selectors are shown conventionally and designated as 160a, 160b, and 160c. The contacts on the panel 160a shown at the top of Fig. 31 are numbered to correspond to the description already presented in connection with Figs. 24 to 27, the ring 165a occupying the first and innermost circle, 136a and 166a disposed on the second circle, 137a and 167a on the third circle, 138a, 168a, 139a and 169a on the fourth circle (corresponding to similarly designated contacts on both fourth and sixth circles in Figs. 24 to 27), and a large number of short contacts 701a, 702a, 703a, etc. disposed in the fifth circle (corresponding to the short contacts 170 of the fifth and seventh circles of Figs. 24 to 27). The contacts on the other two panels are identically similar in dimensions and arrangement and are lettered with the same designated numbers, except that the letter b is substituted for the letter a in the case of the second panel, and the letter c for the letter a in the case of the third and lowermost panel.

Brushes 171, 172, and 173 of Fig. 28 are shown conventionally as one shorting brush, designated 171a on the selector 150a, 171b on the selector 150b, and 171c on the selector 150c, respectively. The brushes 174 and 175 and brushes 140 and 141 are combined for simplicity and shown as a single shorting brush on each selector, designated by the numeral 174a on the selector 150a, etc., respectively. A similar diagrammatic showing and designation is made on the ticket boxes 74a, 74b, and 74c, parking contact fingers 99a, 99b, and 99c, and unparking contact fingers 100a, 100b, and 100c. Similarly differentiated by the suffix letters a, b, and c, Fig. 31 shows conventionally the ratchet wheels 180 which rotate the shorting brushes 171 and 174 across the stationary contacts, and shows the solenoid coils 183, the ratchet driving mechanism 188, and the mechanically lagged contact switch 195. The ratchet mechanism drives the shorting switches in a counterclockwise direction as indicated by the arrows at the center of the selectors.

The neon tubes 124 and 125 are shown diagrammatically in the upper right-hand portion of Fig. 31, but in reality surround the ticket boxes 74a, 74b, and 74c which are grouped adjacent each other. The electric lamps 126a, 126b, and 126c are mounted in the ticket boxes 74a, 74b, and 74c respectively, as described in connection with the description of the ticket boxes. A buzzer 200 is mounted on the ground floor 3 within hearing of the operator, and one is provided for each bay of stalls 9. Photoelectric cells 201 and 202 and their associated amplifying devices are provided for the operation respectively of normally closed switches 203 and 204 which are opened when the photoelectric beam is interrupted and for the operation respectively of switches 205 and 206 which are closed when the photoelectric beam is interrupted. These photoelectric switch mechanisms have been described as mounted upon the transport carriages 23 so as to have the light beams disposed horizontally across the two ends respectively of each transport carriage at such an elevation as to be interrupted by the body of an automobile entering upon or leaving the carriage at either end thereof.

A time lag relay coil 207 is mounted on the bay control panel 151 (see Fig. 2) and is designed to close a normally open switch 208 two or three seconds after it has been energized. A control relay 209 operates normally closed switches 257 and 259 and is a control relay for the ratchet operating relays 183a, 183b, and 183c. A relay 210 is provided for terminating the sequence of steps of any car handling operation, and opens a normally closed switch 218. Selector control relays 211a, 211b, and 211c operate respectively normally closed switches 212a, 212b, and 212c, and operate six normally open switches 213, 214, 215, 216, 217, and 218 and the parts designated by the corresponding suffix letter a, b, or c. Non-interference relays 219, 221, and 223 operate, respectively, normally open switches 220, 222, and 224. Relays 209, 210, 211a, 211b, 211c, 219, 221, and 223 are mounted on the bay control panel 151. Positive and negative conductors 225 and 226, respectively, lead to a source of direct current. Three conductors 227, 228, and 229 lead to a source of three-phase alternating current.

The stall selectors 150a, 150b, and 150c of any one bay are designed and electrically connected with each other and with the ticket boxes 74a, 74b, and 74c and motors operating the car handling mechanism to accomplish two main purposes. One purpose is to electrically energize in proper sequence the car handling motors to park or unpark a car, as the case may be. The other is to prevent interference in the handling of cars to and from the stalls in that bay by allowing only one car handling sequence to be in process at any one time. Since all the selectors are similarly constructed and wired, a description of the selector 150a at the top of Fig. 31 will be made, and the same description will apply to the other two selectors shown in this figure, and, in fact, to all of the other selectors used throughout the system. Each of the contact buttons 104a, 105a, to and including 124a, is wired to control the motor of some car handling device, such as a transport carriage 23, one of the elevators 10, or one of the tilting mechanisms, and is electrically connected, as will be presently explained, across two of the wires 228 and 229 of the three-phase current source. Two or more of these contact buttons scattered along the circle of buttons may be wired to control the same car handling device, for example, the transport carriage 23, and to operate it in the same manner, for example, to a certain stopping point, if in the course of moving a car to or from a certain stall 9 the operation in the same manner of the same device is required at two or more stages of the moving of the car. It will thus be clear that, while for economy of manufacture the selector panels 160 are identically similar in the size and arrangement of contacts, the buttons 104a to 124a are variously wired on the different selectors to secure the proper sequence of car handling movements to take a car from a particular receiving station 13 on the ground floor 3 to a predetermined stall 9, or from a predetermined stall to a particular delivery station 19 on the ground floor. The wiring of the other contacts of all the other circles of contacts and contact segments and contact rings upon any selector panel 160 is identical with the wiring on all other selector panels, and that statement includes contact buttons 101a, 102a, and 103a. The buttons 101a, 102a, and 103a are a part of the electrical connections and devices by which it is made possible for the operator to operate several ticket switches, and yet for only one car to be in process of either parking or unparking to or from a stall 9 in any one bay. The buttons 101a, 102a, and 103a are electrically connected, in a manner to be explained, to the source of direct current supplied by wires 225 and 226, as are also all the other contacts on the panel excepting only contact buttons 104a to 124a. It will be understood, however, that by a rearrangement of wiring and electrical connections, it is possible to operate the entire control mechanism by either direct or alternating current, or to operate the car handling motors by either direct or alternating current, or by a combination of such current sources, without departing from the principles of this invention.

In explaining the electrical connections of the control system shown in Fig. 31 and its method of operation, it is assumed that the brushes 171a and 174a, which are rigidly connected mechanically but electrically separated, are in the position shown in that figure. The relay 183a will be de-energized and the mercury switch 195a in closed position. It is assumed that the operator withdraws from the ticket box 74a the parking end of a ticket, thereby closing the parking switch 99a. Current will then flow from wire 225, through the switch 99a, wire 231, to the parking contact ring 137a, brush 171a, ring 165a, wire 233, to the selector operating relay 183a, thence either by wires 235a, 237, segment 138a, wire 239 to wire 241 and the mercury switch 195a, or by wire 247, segment 168a, wire 249 to wire 241 and the mercury switch 195a. The current will then return from the mercury switch by wire 243 and normally closed switch 212a, and return wire 245 to the negative direct current supply wire 226. Energization of the relay 183a will occur, and the ratchet mechanism 188a will rotate the wheel 180a one notch, which will move the brushes 171a and 174a and bring them to a stop with the brush 174a in contact with the button 101a. Since, however, the button 101a is under these conditions "dead", as will be presently explained, this movement of the brushes effects no change in the electrical connections. The mercury switch has, however, been tilted by the action of the relay 183a and interrupts the current through the path from the wire 225 to the wire 226 which has just been traced. This has the effect of de-energizing the relay coil 183a, and the spring of the ratchet mechanism 188a rotates the wheel 180a another notch, which in turn rotates the brushes until the brush 174a comes to rest between the contacts 101a and 102a, but the ratchet mechanism 180a has also restored the mercury switch 195a to its closed position, which re-energizes the relay 183a. In this manner the brushes are notched forward in a counterclockwise direction by repetitions of the cycle just described until the brush 171a comes into contact with the contact segment 136a in the second circle of contacts on the panel 160a, and at the same time the brush 174a breaks contact with the segment 138a and comes into contact simultaneously with the segment 139a and button 104a. At this juncture current is flowing through the ticket box switch to the segment 137a and divides upon the brush 171a, part of it flowing through the ring 165a and wire 233 through the relay 183a, and part of it flowing through the segment 136a, wire 247, selector control relay 211a, wire 249, normally closed switch 218, and wire 251 to the return wire 245, and thence to the direct current supply wire 226. The relay 211a becomes energized and opens the switch 212a and closes the switches 213a, 214a, 215a, 216a, 217a, and 218a. The opening of the switch 212a interrupts the flow of current through the mercury switch which, now, while it continues to tip back and forth, has no interrupting control of the relay 183a. The closing of the switch 215a has, however, provided a new current path from the relay 183a and wire 235a, through wire 253, switch 215a, wire 255, normally closed switch 257, and closed photoelectric cell switches 204 and 203. The closing of the switch 214a completes a current path from the ring 165a by way of wires 271 and 273, switch 214a, wire 275 to wire 247, through the coil 211a, and as before by wires 249 and 251 to the direct current supply wire 226, which locks in the relay 211a, until such time as its supply is shut off by the opening of switch 218. The closing of switch 213a completes a new circuit from the supply wire 225 by way of wire 261, wire 263, switch 213a, and wire 265 to wire 273 and thence through lock-in switch 214a which insures a supply of current to the relay 211a, should the supply through the ticket box switch 99a fail due to accidental displacement of the ticket box or of the cardboard ticket therein, and a resultant opening of the ticket box switch. The closing of switch 216a completes a circuit from supply wire 229 of the three-phase current by way of a feeder system of wires 285 to wire 283, switch 216a, wire 281, wire 279, light 124, wire 277 to three-phase wire 228, as indicated by the arrows. The neon light is thereby illuminated and notifies the operator that a car handling operation is in process in that bay.

The closing of switch 218a conducts current from wire 261 to wire 261a through lamp 126a to return wire 245, illuminating the lamp and indicating to the operator that a car is being moved to stall 9g. It continues to be illuminated until the relay 211a is de-energized, which occurs, as will be presently explained, upon the completion of the parking of a car in stall 9g. Since the relay 211a is similarly energized during the unparking of a car from stall 9g, it will be similarly illuminated during the process of unparking a car from stall 9g. The closing of switch 217a by the relay 211a has the following effect. Buttons 703a, 703b, and 703c on the parking half of their respective selector panels, and buttons 727a, 727b, and 727c on the unparking half of their respective selector panels are all electrically interconnected by wires 287. These wires 287 are electrically connected by wire 289 to the non-interference relay 219, thence by way of wire 291 and wire 209, switch 217a and return wire 245 to the direct current supply wire 226. It thus follows that if any of the three butttons 703 or 727 are supplied with current from the direct current supply wire 225, a closed path will be afforded for such current back to the direct current supply wire 226. We will suppose now that the brush arm of the selector 150c, the lowermost one of Fig. 31, is pointed horizontally to the left, ready for an unparking operation, and unparking switch 100c is closed by withdrawing the unpark portion of the ticket from that ticket box 74c. The brush arm is notched forward in counterclockwire direction by the action of the relay 183c, and the interrupter 195c, until brush 174c contacts button 727c. The relay 183c is then energized, and the mercury cup has opened its mercury switch. But current can now continue to flow through the relay 183c by the following path, i. e., wire 230c, switch 74c, wire 295, ring 167c, brush 171c, ring 165c, wire 233c, relay 183c, wire 247c, segment 168c, brush 174c, button 727c, wire 287, wire 289, coil 219, wire 291, wire 293, switch 217a, to return wire 245 and direct current supply wire 226. The effect of the closing of switch 217a has been to provide a shunt path for the current and by-pass the mercury switch 195c. Relay 183c is therefore not de-energized and holds its selector wheel stationary until such time as switch 217a is opened, which occurs upon the de-energization of relay 211a, which, as will be later explained, occurs upon the completion of all the car handling movements controlled by the parking half of selector 150a.

We will now suppose that at this juncture a parking ticket is pulled from box 74b, the middle one of Fig. 31. The corresponding brush arm moves as was the case with the other two selectors until brush 174b engages contact 702b. Current can now flow through and from relay 183b by way of wire 235b, wire 237b, segment 138b, brush 174b, button 702b, wire 297, wire 299, coil 221, wire 301, switch 220 (now closed due to previous energization of coil 219 when unpark ticket was pulled from the ticket box 74c), wire 303 and return wire 245 to direct current supply wire 226. Again the mercury switch 195b is by-passed, and the wheel is held stationary until switch 220 is opened by de-energization of relay 219, which will in turn take place when selector wheel 150c moves forward one notch, upon the de-energization of the relay 183c, when switch 217a is opened. It will thus be seen that each wheel is held behind the other an angular distance of two notches, or the angular distance between two contact buttons, for it will be remembered that the effect of the mercury cup, when allowed to act, is to move the wheel two notches for each one energization of the relays 183. When a fourth wheel (not shown) is started to rotate either for parking or unparking by the withdrawal of its corresponding ticket, current flows from its button 701, or button 725 (parking or unparking), through the connecting wires 305, relay 223, wire 307, switch 222 (closed due to action of relay 221 on next previous ticket withdrawal), wire 309, to return wire 245 and direct current supply wire 226. Its wheel then stops with brush 174 on button 701 and the relay 223 closes switch 224, which illuminates the neon light 125 from three-phase wire 229, through feeder system of wires 285, wire 313, switch 224, wire 311, neon light 125, wire 227, to three-phase wire 228. This neon light warns the operator that he has withdrawn all the tickets for which the non-interference devices will provide, and that no more tickets in that bay should be pulled until at least one car handling operation has been completed and the light again darkens.

Returning now to a consideration of the selector 150a, the position of the brush arm, last described, was that in which the brush 174a was contacting button 704a, and brush 171a was contacting segment 136a. It was explained how switch 215a maintained a current flow through relay 183a, and how this switch 215a was maintained in closed position by current flowing through switch 214a, which locked in the relay 211a. These results were obtained by the electrical connection between brush 171a and segment 136a. At the same time, brush 174a is initiating the first car handling operation. To accomplish this, alternating current is conducted from wire 229 by means of feeder system 285, to segment 139a. It will be observed that current is supplied through the same feeder system 285 to segments 169a, 139b, 169b, 139c, and 169c. Current then flows from segment 139a, through brush 174a, to button 704a, and thence to a control relay 401a, Fig. 32, for operating the transport carriage motor, as will be explained presently. This relay 401a, by means of switch 403a, sends alternating current through relay 209 at the lower portion of Fig. 31 by way of wire 315, relay 209, wire 317, wire 319, to three-phase wire 228. Relay 209 then opens switch 257, which de-energizes selector operating relay 183a, and the ratchet mechanism rotates the selector one notch forward and comes to a stop with the brush 174a midway between contacts 704a and 705a. Although brush 171a at the same time has passed out of contact with segment 136a, relay 211a is still energized because it has locked itself in energized position through switch 214a, or through both switches 213a and 214a, and will remain energized until switch 218 is opened.

Upon the completion of the car handling function controlled by button 704a, relay 401a, Fig. 32, is de-energized automatically, as will be explained in connection with Fig. 32, and this in turn through the opening of switch 403a de-energizes relay 209, Fig. 31, which closes the normally closed switch 257. The closing of the switch 257 energizes the selector operating relay 183a, and the wheel is moved one notch forward which brings brush 174a into contact with button 705a, and the next car handling function is initiated. Sufficient button contacts 704a, 705a, etc., are provided to care for the number of car handling functions required in the operation of moving a car to or from that certain stall in the building, which operation involves the maximum number of functions. Only that number of contacts 704a, 705a, etc. are wired for function operation on any one wheel as are needed for parking and unparking a car from its corresponding stall 9. That means that for most of the wheels there will be one or more idle contacts at the end of the semi-circular row of contacts. When brush 174a contacts the first of these idle contacts, which in the case of selector 150a happens to be contact 721a, current flows from the segment 139a, which is always energized from feeder wire system 285, across the brush 174a to contact 721a, wire 321 to feeder wire system 323, thence through the sequence terminating relay 210 and wire 325 to three-phase supply wire 228. Relay 210 then opens switch 218, which de-energizes coil 211a, which closes switch 212a and opens switch 215a. These changes re-establish a circuit through the relay 183a and mercury switch 195a, and the ratchet mechanism idles the selector forward until it reaches the end of the parking semicircle, and breaks contact with the live segment 137a, and engages the dead segment 167a. The relay 183a is de-energized and remains so until the withdrawal of the unparking portion of the ticket supplies current to the segment 167a.

While the car handling functions are in process, as the selector operates progressively over the buttons 704a to 720a, I provide certain safety devices to notify the operator of the stalling of a car and to prevent trouble due to such stalling. It will be recalled that during the car handling functions, the relay 183a is energized by current flowing from the switch 215a through the wire 255, the switch 257, and photoelectric cell switches 204 and 203 operated by photoelectric cells 202 and 201, respectively, mounted on the transport. Should a car stop in position to interrupt either of these beams, the corresponding switch will de-energize the relay 183a and stop all functions until the car is moved on. Also, if current flows from the feeder wire system 285 through any one of the switches 216a, 216b, or 216c to the wire 281, which will be the case whenever car handling functions are in process, current will be conducted from this wire 281 by way of wire 327 and wire 329 to the switches 205 and 206, in parallel, thence by the wire 331 to the time lag relay 207 and by wire 333 and the wire 319 to three-phase supply wire 228. Thus, if a car is stalled in the path of either of the light beams for more than the time interval for which the time lag relay 207 is set, this relay will close the switch 208, which will close the current path from the feeder wire system 285 through wire 335, buzzer 200, switch 208, to wire 333, wire 319, and supply wire 228, notifying the operator that the car is stalled on the transport carriage. Similarly, if the relay 209 is de-energized at the end of one functional operation, and for some reason the next function should not begin after a reasonable interval, thereby re-energizing it, time lag relay 207 will ring buzzer 200, when current passes from wire 327 through wire 337 and switch 259, time lag relay 207 and wires 333 and 319 to supply wire 228. This warning signal will be given, however, only while the selector brushes are in the functional portion of their angular movement, for it is only then that wire 225 is receiving current through one of the switches 215a, 215b, and 215c.

*Transport control*

Fig. 32 shows the wiring of the transport motors and the transport motor control system. At the left of the figure are shown diagrammatically the contact buttons 701a, etc., 701b, etc., and 701c, etc., of the three selector wheels shown in Fig. 31. For economy of space on the drawing sheet, they are shown in a straight line row, although in actual construction they are arranged in a circle on the stationary selector panels 160a, 160b, and 160c. All buttons not related to the transport carriage control are shown in phantom lines. Wires 227, 228, and 229 represent the three conductors leading to a source of three-phase alternating current. Wire 315 is the same wire 315 shown on Fig. 31 and is electrically connected to relay 209 shown on Fig. 31. The transport carriage 23 is equipped with two three-phase motors 33 which are operated as one power unit and are accordingly shown conveniently and diagrammatically as one motor on Fig. 32 of which the high speed windings are indicated by the designation 33a, and the low speed windings are indicated by the designation 33b. The electromagnetic brakes for the motors are indicated by the single conventional showing of a solenoid coil 33c. The sliding contacts between conductor rails 54 and brushes 55 (Figs. 7 and 8) are indicated conventionally at 54a and 54b. Five transport carriage motor selector switches 53 (Figs. 2, 6, 10, and 11) are shown at 53a, 53b, 53c, 53d, and 53e. 53a and 53e are mounted at the side of the runway of the transport carriage 23, as shown in Fig. 2, in position to bring the carriage to a stop at the extreme right (stall 9f) and extreme left positions of its range of travel. The three intermediate selector switches 53b, 53c, and 53d are mounted as shown in Fig. 2 and bring the carriage 23 to a stop at stall 9e, elevator hoistway 16c, and elevator hoistway 16a, respectively. The remaining selector switches adapted to stop the carriage at other positions are not shown in Fig. 32, since they are but duplications of 53b, 53c, and 53d in their electrical connections and in their principle of operation. When the brush holder of one of the selector switches, for example 53b, is in its uppermost position, contacts 509b are electrically connected, as are also contacts 508b. When the brush holder assumes its upper intermediate position, only contacts 508b are electrically connected. When the brush holder assumes a horizontal position, no one of the four pairs of contacts is electrically connected. When in its lower intermediate position, the brush holder electrically connects contacts 507b only. When in its lowermost position, it electrically connects contacts 507b and also electrically connects contacts 506b.

Each switch 53a, etc., has a corresponding control relay 401a, etc., each of which operates normally open switches 403a, 405a, and 407a. Relays 409 and 411 are provided for controlling the direction of rotation of the transport carriage motors 33, the relay 409 when energized causing a movement of the associated carriage 23 to the right, and the relay 411 when energized causing a movement of the carriage to the left. The relay 409 operates normally open switches 413, 415, and 417, and the relay 411 operates normally open switches 419, 421, and 423. Relays 425 and 427 control the carriage motor speed, the relay 425 when energized making connections for high speed rotation of the motors 33, and the relay 427 for low speed rotation of the motors. The relay 425 controls normally open switches 429 and 431 and normally closed switch 433, and the relay 427 controls normally open switches 435 and 437. The relays 401a, etc., 409, 411, 425, and 427 are mounted on the corresponding bay control panel 151.

Whenever it is required, in the sequence of car movements for parking or unparking a car from any certain stall 9, that the transport carriage 23 of that bay be moved in alignment with either an elevator or stall station, that one of the stall selector buttons 704a, etc., next in advance on the selector contact panel, causes an electrical connection to be made with that one of the transport carriage switches 53a, etc., corresponding to that certain position of alignment, and all such buttons on all stall selectors of that bay are connected to that certain transport carriage switch. We will assume that it is desired to move the carriage 23 from a position in which the carriage station 23' registers with the stall 9f to a position in which the carriage station 23' registers with the stall 9e. Switch 53b is the switch corresponding to position opposite the stall 9e. All switches will be in the lowermost position because the carriage has at some previous movement or movements passed them all from right to left and has, by means of its cam groove 51 coacting with the cam follower 52, raised all the brush holders 516 to their respective uppermost positions. Contact buttons 707a, 715a, 731a, and 739a on the stall selector 159a are all connected to this carriage selector switch 53b because, in parking or unparking a car from stall 9h (which is controlled by selector 150a), a movement of the carriage to a position in which the carriage station 23' registers with the stall 9e is required at those particular junctures when the selector wheel reaches the contact buttons 707a, 715a, 731a, and 739a. When, for example, the button 707a is energized, current flows to a common feed wire 439, to wire 441, relay 401b, contacts 507b, wire 443, wire 445, and relay 411 to return supply wire 228. Relays 401b and 411 are energized and close their associated switches 403b, 405b, 407b, and 419, 421, and 423, respectively. Current then passes from supply wire 229 through switch 403b, wire 315, relay 209, to supply wire 228. Relay 209 opens switch 257 (see Fig. 31) which de-energizes relay 183a which rotates the selector brush 174a to a position between buttons 707a and 708a, where it is temporarily held, but switch 405b (see Fig. 32) has now locked in relay 401b, transmitting current to it through wire 447b from supply wire 229. Switch 407b has also been closed by relay 401b which conducts current to the transport carriage selector switch contacts 506b, thence by wire 449 to wire 451, switch 419, wire 453, to high speed relay 425, to supply wire 228. High speed relay 425, when thus energized, closes switches 429 and 431 and current is supplied to all three terminals of the high speed windings 33a of the three-phase motor 33 as follows: to one terminal direct from wire 228; to a second terminal from supply wire 229 to wire 229a, wire 455, switch 423, wire 457, wire 459, conductor rail sliding contact 54b, wire 461, switch 431, wire 463, to motor terminal; to a third terminal from supply wire 227 by way of wire 465, switch 421, wire 467, conductor rail sliding contact 54a, wire 469, switch 429, and wire 471.

The brake electromagnet 33c is energized by current between wires 473 and 469 and acts to release the motor brake. The carriage 23 is then propelled to the left at high speed until the cam follower 52 engages the cam groove 51 at 51d, which raises the switch brush holder 516 to its lower intermediate position, which disconnects contacts 506b, which deenergizes relay 425, which opens switches 429 and 431, thereby disconnecting the high speed windings 33a of the motor 33, and closes switch 433, thereby sending current from wire 469 through switch 433 to low speed control relay 427 which, in turn, closes low speed switches 435 and 437. These switches 435 and 437 complete connections to the low speed windings 33b as follows: to one terminal direct from supply wire 228; to a second terminal from supply wire 229 by way of wire 229a, to conductor rail contact 54b as before, then by wire 473, switch 437 and wire 475; and to the third terminal from supply wire 227, as before, to conductor rail sliding contact 54a and wire 469, then by wire 477, switch 435, and wire 479. The carriage 23 then moves at low speed until the cam follower 52 moves the brush holder 516 to a horizontal position, which de-energizes all the transport control wires and de-energizes relay 401b. Brake electromagnet 33c is de-energized, causing the motor to come to an immediate stop. It will be noted that the de-energization of relay 401b opens switch 403b, which, by de-energizing relay 209 (see Fig. 31), closes switch 257, which in turn energizes selector relay 183a which turns the selector brush 174a to the next position at which the selector button 708a is energized and starts the next functional movement of the car handling operation.

The description of the manner in which the carriage 23 has been thus moved will make it clear how the carriage can be moved to any other position, either to the right or to the left, depending upon its initial position and upon which one of the carriage selector switches along its line of travel is energized by one of the stall selector functional contact buttons 704a, etc. Such a control system is commonly used in elevator construction, but I believe I am the first to utilize this type of control for horizontally moving carriages and in combination with devices for controlling other movements of an automobile to or from a parking stall.

Contact buttons 737a, 734b, and 731c are all connected to wire 481 which leads to two switches 855 and 866 (see Fig. 34) of the elevator control system, one of which switches causes, when closed, the call of one elevator, for example, 10c, to the bay, and the other of which, when closed, causes the call of another elevator, for example, 10a, in a manner to be explained in connection with Fig. 34 of the drawings. Wire 483 leads back from switch 866 to transport carriage selector switch 53c which, when active, stops the carriage opposite the corresponding elevator hoistway, for example, elevator hoistway 16a. Wire 485 similarly leads from switch 855 to selector switch 53d which, when active, stops the carriage opposite another elevator hoistway corresponding to switch 53d, for example, elevator hoistway 16c, for, as will be explained later, my control system is designed to call either of two of the four elevators for unparking cars from any one bay on any one floor so as to facilitate unparking operations.

Tilting mechanism control

Fig. 33 shows the wiring of the tilting mechanism motors 41 and the tilting mechanism motor control system. As in Fig. 32, at the left of this figure are shown diagrammatically the contact buttons 701a, etc., 701b, etc., 701c, etc., of the three selectors 150a, 150b, and 150c, respectively, shown in Fig. 31. All buttons not related to the control of the tilting motors are shown in phantom lines. Supply wires 228 and 229 lead to a source of current, preferably to two of the terminals of the same three-phase source of current which operates the transport carriage motors and which are shown in Fig. 32. Wire 315 leads to the relay 209 shown on Fig. 31.

41b represents the tilting motor at the stall end of the right-hand station 23' on the transport carriage. 41b represents the tilting motor at the elevator end of this carriage station 23', 41c the tilting motor at the elevator end of the left-hand carriage station 23'', 41e the tilting motor at the rear end of stall 9e, 41e' the tilting motor at the front end of stall 9e, 41f the tilting motor at the rear end of stall 9f, 41f' the tilting motor at the front end of stall 9f, 41g the tilting motor at the rear end of stall 9g, and 41h the tilting motor at the rear of stall 9h. 54c, 54d, 54e, 54f, 54g, 54h, 54i, 54k, and 54m are conductor rail sliding contacts (see Figs. 7 and 8). 44a, 44b, etc. (see Figs. 9, 12, and 13) are the tilting motor limit switches operated by the contact pins 47a, 47b, etc. 601a, 601b, etc., are the tilting motor control relays mounted on the bay control panel 151 and each operating three normally open switches 602a, 602b, etc., 603a, 603b, etc., and 604a, 604b, etc. Whenever, in the sequence of functional operations required for the parking or unparking of a car to or from a certain stall, it is necessary to tilt the carriage guides 24 or stall guides 24a, that one of the buttons 704a, etc., on the corresponding stall selector panel next to be contacted by the brush 174 is, in the design of the control system, electrically connected to energize that one of the tilting motor control relays 601a, 601b, etc., which is associated with the motor which performs the desired tilting operation. Thus, it will be observed on Fig. 33 that on selector 150a buttons 706a, 716a, 730a, and 740a are all connected to wire 605 from which a lead 606 goes to relay 601e, which controls the motor 41e, which tilts the guides 24a in stall 9e toward the transport lane 8 and causes a car at that station to roll onto the transport carriage 23. When any one of these buttons is energized by the brush 174a, current flows through relay 601e and thence by wire 607 to switch 44e which is in closed position (see Figs. 12 and 13) and on by way of wires 608 and 609 to supply wire 228. Relay 601e then closes its three associated switches 602e, 603e, and 604e. 604e conducts current from supply wire 229 by way of wire 315 to relay 209, which opens the circuit of relay 183a and allows the selector brush 174a (see Fig. 13) to move to a position between two buttons on the selector panel 160a. Switch 602e conducts current from supply wire 229 by way of wire 610 to relay 601e which is then locked in active position until the tilting operation is completed, despite the movement of the brush 174a away from the button 706a or any other button which may have originally caused the energization of relay 601e. Switch 603e closes the circuit from supply wire 229 to the tilting motor 41e by way of wire 611 and wire 609 to the supply wire 228.

The motor 41e then rotates in a clockwise direction, tilting its associated stall guides 24a during the first half of the revolution of the tilting cams 38 (see Figs. 12 and 13), and returning the stall guides to a horizontal position during the last half of the revolution of the tilting cams. Near the end of this revolution of the cams, pin 47e opens the switch 44e which breaks the path of the current through relay 601e. The relay is de-energized, and its three switches are opened. The opening of locking-in switch 602e resets the relay for the next occasion of the operation of motor 41e. The opening of switch 603e stops the motor 41e, and the opening of switch 604e stops the supply of current to relay 209 (see Fig. 31) which has the effect of closing normally closed switch 257. Through switch 257 current then flows to relay 183a, the ratchet mechanism 188a turns the selector wheel 180a one notch, and the next functional contact button initiates the next functional operation of the car handling sequence.

Wires 613 and 614 respectively lead to and from a switch 858 (see Fig. 34) in the elevator control mechanism, as will be more fully described in connection with the explanation of Fig. 34, and ties in the operation of tilting the left-hand carriage station 23' toward the elevator, with the elevator control system. Wire 613 leads from those buttons, for example, 738a, 735b, and 732c, which call for this particular tilting operation, and wire 614 leads to relay 601a which controls the motor actuating this particular tilting mechanism.

It will be understood that there is a tilting motor and tilting motor control for each end of each stall of the front row of nine stalls, one for the rear end of each stall of the rear row of nine stalls, one for that end of stall 9a remote from the carriage 23 which serves it (see Fig. 2), and one for each end of each of the two or more stations on the transport carriage 23, but, for simplicity of illustration, only nine of these tilting motors and tilting motor controls are shown in Fig. 33, since they are the only ones called into action by stall selectors 150a, 150b, and 150c, which stall selectors are representative of the only three typical car handling sequences for either parking or unparking. The car handling sequence of operations for parking and unparking a car in any other stall is but a repetition of the car handling sequence of one or the other of these three typical cases.

*Elevator control*

Fig. 34 shows the elevator control mechanism including the elevator tilting motor 820 and tilting motor control, which motor and control, for the purpose of clarity, are not shown in Fig. 33. The contact buttons of three typical stall selectors are again conventionally shown at the left-hand edge of Fig. 34, only those buttons related to the elevator control being shown in solid lines, with the remainder shown in phantom lines. Current for the control circuits is obtained from the supply wires 229 and 228. Each elevator is designed to park cars on predetermined floors, and, in the embodiment of my invention shown in the drawings, each elevator serves for parking purposes one fourth of the total number of floors. For unparking purposes, each floor is served by two elevators, either of which may be called in a manner to be presently explained. It will be assumed that selectors 150a, 150b, and 150c are selectors for stalls on the third floor and that elevator 10c serves it for parking purposes and it is served by both elevators 10c and 10a for unparking. Fig. 34 shows diagrammatically the wiring to accomplish this elevator service for the third floor, and it will be understood that the other bays of the other floors are provided with similar control systems.

Wires 824 and 825 represent two portions of the current supply wire for the operation of the elevators. Wire 315 leads to relay 209. Relay 803 is an elevator park signal relay for one of the third floor bays, is mounted on the control panel 151, and operates normally open switches 804, 805, 806, 807, and 817. Relay 810 is the elevator auxiliary parking relay for the bay, is mounted on control panel 151, and operates the normally open switches 811, 812, 813, and normally closed switch 814. Relay 826 is the main floor elevator parking relay, is mounted in penthouse 15, and operates the normally closed switch 827 and the normally open switches 828, 829, and 830. Relay 808 is the non-interference elevator relay, is mounted in the penthouse 15, and operates the normally closed switch 872. Switch 809 is an upper floor master elevator hoistway door trip switch mounted in position to be operated by the third floor hoistway door 14b' on the side toward the bay. Switch 824a is a main floor elevator hoistway door trip switch mounted in the path of the hoistway door 14c on the side of the hoistway toward the receiving station 13c. Switch 873 is a normally open, automatically reset trip switch mounted in the path of this same main floor elevator hoistway door 14c on the receiving side of the elevator shaft 7. A photoelectric cell assembly 818 is mounted with its beam playing across the ends of the receiving station 13c adjacent the elevator shaft 7 and operates the normally open switch 831. Relay 874 is a parking main floor elevator control relay mounted in the penthouse 15 which, when energized, closes a normally open switch 883 and opens a mechanically latched switch 876. Relay 875 is another main floor elevator control relay also mounted in the penthouse 15 which, when energized, closes the mechanically latched switch 876.

Relay 819 is a third floor master tilting control relay, is mounted on the third floor bay control panel 151, and operates the normally open switches 832 and 833. Relay 834, an elevator tilting control relay associated with the motor for tilting the elevator guides toward the third floor bay transport carriage, is mounted in the penthouse 15 and operates normally open switches 835, 836, 837, and 838. Motor 820 tilts the elevator guides 24b and is mounted at that end of the elevator guides adjacent the receiving station and adapted to roll the car onto the transport carriages operating above the delivery station end 18 of the building, or onto one of the delivery stations 19a, 19b, 19c, and 19d on the first floor. For the sake of simplicity, the motor for tilting the elevator guides in the other direction and its associated control devices are not shown in Fig. 34, since they are not involved in the sequence of car movements of car handling operations which are related to the stalls controlled by stall selectors 150a, 150b, and 150c. Switch 839 is a tilting motor limit switch for the elevator tilting motor 820. Relay 840 is an interlock reset control relay for the elevator tilting control devices. It is mounted in the penthouse and operates a normally closed switch 841.

Photoelectric cell assemblies 821 and 822 are mounted with their beams playing across the receiving and delivery ends respectively of the elevator guides 24b, and operate the normally closed switches 843 and 842, respectively. Relay 823 is an elevator door closing control relay, is mounted in the penthouse, and operates the normally open switch 877. A master elevator control rotational selector 801 is mounted in the penthouse for the control of the elevator 10c, and each of the elevators is associated with another such rotational selector, not shown in Fig. 34. An electric conductor arm 844 of this selector 801 is rotated by a selector motor 802 and contacts successively in its path of rotation parking contacts 846, 846a, etc., and unparking contacts 845, 845a, etc. These contacts are arranged in a circle with an unparking contact always following a parking contact, and vice versa. A relay 815 controls the operation of the selector motor 802, is mounted in the penthouse, and operates a normally closed switch 816. A sequence relay 848 is mounted in the penthouse and operates normally closed switch 850 to complete the call of the elevator to the main floor for unparking. 859 is a relay for calling either elevator 10c or 10a to the third floor for unparking, is mounted on the third floor bay control panel 151, and operates normally open switches 860, 861, 862, 863, 936, and 937. Each of the two bays on each floor is equipped with a similar relay for selectively calling either one of two elevators.

Relay 849 is selectively energized by relay 859, is designed to call elevator 10c to the third floor for unparking a car, is mounted on the third floor bay control panel 151, and operates normally open switches 851, 852, 853, 854, 855, and 856, and normally closed switches 857 and 858. A similar relay (not shown) is mounted on the control panel of each other bay served by elevator 10c. Relay 864 is a relay for calling elevator 10a to the fifth floor for unparking, is mounted on panel 151, and operates eight switches corresponding to those operated by relay 849, but only three of which are shown, i. e., normally open switch 866 and normally closed switches 865 and 955. Relay 868 is a relay for calling the elevator to the main floor for unparking, is mounted in the penthouse, and operates the normally open switches 869, 870, and 871. A normally closed trip switch 867 is mounted in the path of the elevator hoistway door 14c' at the main floor on the delivery side 18 of the elevator shaft. A normally open trip switch 878 is also mounted in the path of the main floor elevator hoistway door 14c' of the elevator 10c on the delivery side of the hoistway. Each elevator hoistway is provided with similar trip switches. Relay 879 is a control relay for the elevator tilting motor 820, additional to the elevator control relay 834. It is mounted in the penthouse and operates normally open switches 880 and 881. Wires 613 and 614 are electrically connected to the terminals of the normally closed switches 856 and 955 respectively, and are a continuation of identically designated wires on Fig. 33. Wire 481 is connected in parallel to one terminal of switches 855 and 866 respectively, and is a continuation of identically designated wire on Fig. 32. Wires 483 and 485 are electrically connected to the other terminals respectively of switches 866 and 855 and are a continuation of identically designated wires on Fig. 32.

A tilting motor 886 is provided for elevating the rear end of the receiving station guides 24c of the receiving station 13c. This motor 886 is provided with a control relay 882 which operates normally open switches 884 and 885. A normally closed limit trip switch 887 is also associated with the tilting motor 886.

A wire 888 leads to a parallel connection with the other bay park signal relays on other floors served by the elevator 10c for parking, such relays corresponding to the relay 803. A wire 889 leads to a parallel connection with other switches on the floor bays served by the elevator 10c for parking, such switches corresponding to the switch 811. A wire 890 leads to a parallel connection with other switches on floor bays served by the elevator 10c for parking, such switches corresponding to the switch 812. A wire 891 leads to a parallel connection with other master tilting control relays on the floor bays served by the elevator 10c for parking, such relays corresponding to the relay 819. A wire 892 leads to a parallel connection with other switches on other floor bays served by the elevator 10c for parking, such switches corresponding to the switch 832. A wire 893 leads to a parallel connection with other parking auxiliary relays on other floor bays served by the elevator 10c for parking, such relays corresponding to the relay 810. A wire 894 leads to a parallel connection with other switches on other floor bays served by elevator 10c for parking, such switches corresponding to the switch 806. Wires 895 and 896 lead to other switches respectively on other floor bays served by the elevator 10c for unparking, such switches corresponding to the switch 860. Wires 897 and 898 lead to parallel connections with the two terminals respectively of switches on the other floors served by elevator 10c for parking, such switches corresponding to the switch 807. A wire 899 leads to parallel connections with other switches on other floor bays served by elevator 10c for parking or unparking, such switches corresponding to switch 805 or switch 862. A wire 900 leads to a parallel connection with other switches on other floor bays served by elevator 10c for parking or unparking, such switches corresponding to switches 813 or 851. A wire 901 leads to a parallel connection with other switches on other floor bays served by elevator 10c for unparking, such switches corresponding to switch 854. A wire 902 leads to a parallel connection with other switches on other floor bays served by elevator 10c for unparking, such switches corresponding to switch 856. A wire 903 leads to a parallel connection with other switches on other floor bays served by elevator 10b for unparking, such switches corresponding to switch 853. A wire 938 leads to a normally closed switch corresponding to switch 816 and operated by a relay corresponding to relay 815 (this switch and relay not shown), which switch and relay are associated with the elevator 10a. A wire 939 leads to the third floor unparking contact of the rotational selector of elevator 10a (this contact and rotational selector not shown). A wire 940 leads to a parallel connection with other relays for calling elevator 10c to floors other than the third floor for unparking a car, which floors are designed to be served by that elevator, such relays corresponding to relay 849.

Elevator control parking

When in the course of the rotation of stall selector 150a, contact button 709a is energized, current flows through wire 904 to relay 803, thence by wire 905 through normally closed switch 872 to supply wire 228. Switch 872 will be closed unless the elevator is on another call, as will be presently explained. Relay 803 then closes its five associated switches. Switch 817 sends current by wire 315 to relay 209 which operates as before to rotate the selector 150a to a neutral position between buttons 709a and 710a. This would de-energize relay 803 except for the fact that switch 804 has been closed, locking in this relay 803. Switch 805 conducts current from supply wire 229 by way of wire 906 through normally closed switch 816 to motor 802, thence by wire 907 to supply wire 228. Motor 802 rotates the arm 844 until it contacts parking contact 846 which completes a circuit from supply wire 229 through wire 910, arm 844, wire 909, wire 911, through switch 807 to relay 826, wire 912, and normally closed main floor park side hoistway door trip switch 824a to supply wire 228. Relay 826 then opens switch 827, which controls the call of the elevator to the third floor and closes switches 828, 829, and 830. Switch 829 closes the connection by way of wire 913 across wires 909 and 911, which has the effect of locking in energized position relay 826 against the subsequent opening of switch 807. Switch 830 closes a circuit from wire 229 by way of wire 908 and switch 806 to relay 810 and normally closed upper floor hoistway door master trip switch 809 to supply wire 228. This relay 810 then closes switches 811, 812, and 813, and opens switch 814. Switch 811 then closes the circuit from supply wire 229 by way of wire 914 to relay 808. This relay when energized opens switch 872, which prevents an elevator parking call coming in over wire 888 from any other floor bay and also de-energizes relay 803. The opening of switch 817 then, through relay 209, rotates the stall selector 150a and energizes contact 710a, which calls the transport carriage to the elevator hoistway 16c. The opening of switch 805 stops the motor 802 with the arm 844 on the parking contact 846, thus maintaining energization of relay 826 through wires 909 and 913. It will be observed that the operation of a relay corresponding to 810 on any other floor bay served by elevator 10c will similarly energize relay 808 through wire 889 and prevent relay 803 on the third floor from taking an elevator call. Switch 806 when opened will not de-energize relay 810, which is now locked in through switch 811 and wire 915. Switch 813, now closed, conducts current from supply wire 229 by way of wires 914, 916, and 917 to relay 815, which then opens switch 816, preventing operation of the motor 802 until relay 810 is later de-energized. When relay 826 was energized and closed switch 828, it set up a call for elevator 10c, which will bring it in accordance with standard elevator control construction to the main floor to receive the automobile waiting to be parked. When the elevator reaches the main floor, it is automatically stopped there by the usual and standard elevator control devices (not shown). Also by standard elevator control mechanism, of which the wiring is not shown, the parking side hoistway door adjacent the receiving station 13c is opened, which opens trip switch 824a. This de-energizes relay 826 and opens switches 828, 829, and 830 and closes switch 827. The opening of this door also operates another normally open trip switch 873, which is constructed to close momentarily and immediately re-open. While closed, it energizes relay 874 by closing the circuit from supply wire 229 by way of wires 919 and 920 to supply wire 228. This closes switch 883 which energizes relay 882, which causes tilting motor 886 of receiving station 13c to operate in the manner described in explanation of Fig. 32. In this manner the waiting automobile is rolled into the elevator 10c. Relay 874 when energized also opens switch 876, which breaks the circuit from elevator control supply wire 824 by way of wire 921 through switch 827, now closed, switch 876, now open, and switch 812, now closed, to elevator return supply wire 970. But when the car has rolled into the elevator, and in doing so intercepts the light beam of photoelectric cell assembly 818 which plays across the path of the automobile between the receiving station and the hoistway door, switch 831 is momentarily closed, which conducts current by way of wire 922 to relay 875, which closes the mechanically latched switch 876, completing the circuit to the elevator control system which calls the elevator to the third floor. In accordance with standard elevator control practice, this call first closes the hoistway door, which automatically completes the circuits for moving the elevator. Interposed in the door closing circuit, which is indicated conventionally on the drawings by the wire 923, is the normally open switch 877 which is closed by relay 823 when the photoelectric cell assemblies 821 and 822, whose beams are disposed across the two ends of the elevator respectively, both have their beams uninterrupted by an automobile. Until the automobile has taken its proper position on the elevator, the hoistway door cannot close and the elevator cannot begin its upward movement. When the elevator reaches the third floor, the upper floor hoistway door master trip switch 809 is tripped and opened by the hoistway door when it is automatically opened by the usual and standard elevator control devices (not shown). This de-energizes relay 810, which by means of switch 813 de-energizes relay 815, closing switch 816 and resetting the circuit to motor 802 for the next call of a stall selector either from the third floor or over wire 899 from any other floor. Switch 811 de-energizes relay 808 which permits the elevator to take another call as soon as its hoistway door is again closed. The automatic relationship of the closing of the hoistway door to the starting of the elevator is standard elevator control and is not shown in the drawings. The elevator control system is also provided with a standard time lag device (not shown) which prevents it from accepting another call for a sufficient interval of time to permit the automatic rolling of the automobile from elevator onto the transport carriage, which is accomplished as follows:

The transport carriage has responded to the call of contact button 710a and arrived opposite hoistway 13c. Upon the completion of the movement of the transport to the elevator hoistway 16c, accomplished through the energization of contact button 710a, the selector 150a moves its brush arm 174a into contact with button 711a, which causes the energization of relay 819 by way of wire 924, wire 925, switch 814, now closed, relay 819, wire 925, wire 926, and normally closed switch 841 to supply wire 228. If the elevator call had not been completed, switch 814 would still be open, which prevents the actuation of the elevator tilting motor until the elevator is in position to unload. Relay 819 locks itself in active position by switch 833 and wire 927. It also closes switch 832, which carries current from supply wire 229 by way of wire 928 to relay 834 and limit switch 839 and wire 929 to supply wire 228. Switches 835, 836, 837, and 838 are thereby closed. Switch 838 energizes relay 209, Fig. 31, by closing the circuit from supply wire 229 through wires 930 and 931 to wire 315, and the stall selector brush 174a is thereby rotated to a neutral position between two functional contacts. Switch 836 conducts current from wire 930 to relay 840 by way of wire 932, which relay 840 then opens switch 841, which prepares relay 819 for de-energization and resetting its switches for later operation. By means of wire 891 leading to a parallel connection with other floor master tipping control relays, this relay 840 serves a common purpose for all floors served by elevator 10c. Relay 819 is not, however, immediately de-energized as current can still flow through it by the new current path of wire 933, switch 835, and wire 934 to supply wire 228. Switch 837 conducts current to the elevator tilting motor 820 by wire 935 which operates to roll the car from the elevator, and at the end of its cycle of movement opens switch 839, which de-energizes relay 834, which in turn through the opening of switch 835 de-energizes relay 819. Switch 838 then de-energizes relay 209, Fig. 31, and the selector wheel is moved a notch forward to make the next functional contact. It will be observed that relays 834 and 840 are mounted in the penthouse and are connected to the tilting control devices for the elevator on all the other floors served by that elevator. The hoistway door is now automatically closed, and the elevator remains at the third floor awaiting its next call. The parking function is complete, and all relays and switches are properly set for a subsequent parking function.

Elevator control unparking

The three contact buttons 736a, 733b, and 736c are all connected to wire 941, and when any one of them, for example 736a, is energized, current is conducted by way of wire 941 through switches 857 and 865 to the unparking signal relay 859 for the third floor bay with which the three stall selectors 150a, 150b, and 150c are associated. Switches 857 and 865 will be closed if neither elevator 10c nor 10a is in the course of responding to a call to this bay, as will be presently explained. Relay 859 closes its associated switches 860, 861, 862, 863, 936, and 937. Switch 863 conducts current from supply wire 229 by way of wires 942 and 943 to wire 315, which operates relay 209 (see Fig. 31) and operates the ratchet mechanism 180a to advance the brush 174a to a neutral position between contact buttons 736a and 737a. Switch 861 by means of wire 944 locks relay 859 into active condition despite the deenergization of button 736a. Switch 862 conducts current from wire 942 by way of wire 945 to wire 906, through normally closed switch 816 to the motor 802 which operates the rotational selector 801 of the elevator 10c, and thence by wire 907 to the supply wire 228. Switch 816 will be open if elevator 10c is responding to any other call. Otherwise the rotational selector will begin to turn. Wire 938 leads from switch 936 also controlled by relay 859 to a normally closed switch corresponding to switch 816 operated by a relay corresponding to relay 815 (this switch and relay not shown), which switch and relay are associated with elevator 10a. If switches 816 of both elevators are open, the call to the third floor will be held in abeyance until one or the other is closed. If both are closed, both rotational selector motors 802 will operate until one or the other of the elevator rotational selector arms 844 reaches the third floor unpark button. If one only is closed, the corresponding elevator will be called, and not the other elevator. We will assume that switch 816 of elevator 10c is closed. The motor 802 rotates the arm 844 until it reaches the third floor unpark button 845. Current then flows from supply wire 229 by way of wire 910, arm 844, contact 845, wire 946, switch 860, wire 946 again, relay 849, wire 946, wire 908, upper floor hoistway door trip switch 809, to supply wire 228. Switch 937 conducts current to wire 939 which leads to the third floor unparking contact of the rotational selector of elevator 10a, and will call that elevator when elevator 10c is already responding to a call.

Returning now to relay 849, which is assumed to be energized by the closing of switch 860, its energization closes switches 851, 852, 853, 854, 855, and 856, and opens switches 857 and 858. Switch 852 locks in its relay by means of wire 947. Switch 851 conducts current by wires 948, 916, and 917 to relay 815 and supply wire 228. This relay opens switch 816, which stops the rotational motor and prevents elevator 10c from accepting any more calls until it is de-energized at the end of the call upon which it is engaged. Switch 856 completes the elevator operating circuit which moves the elevator to the third floor, from supply wire 825, by way of wire 949, to the elevator control devices. Switch 854 closes the circuit to relay 848 by way of wire 950, which opens switch 850. The opening of this switch breaks the circuit from elevator control wire 825 by way of wire 951 and switches 850 and 869 to the elevator control signal circuit which calls the elevator to the main floor, and prevents response to such call until it is again closed. Switch 853, however, has by way of wire 952 energized relay 868, which is the main floor unparking control signal relay, and this relay thereupon closes its three switches 869, 870, and 871. Switch 870 is the lock-in switch sending current to its own relay through wire 953. Switch 871 conducts current from supply wire 229 by way of wire 954 to wire 916 and relay 815, which prepares that relay to hold switch 816 open and prevent response of elevator 10c to another call upon the later opening of switch 851 at the completion of the movement of the elevator to the third floor. Switch 869 closes the circuit through wire 951, except for the open switch 850, which remains open until the completion of the movement of the elevator to the third floor.

When the elevator arrives at the third floor and the hoistway door automatically opens, switch 809 is tripped, which breaks the circuit through relay 849, resetting the relay 849, de-energizing relay 848, closing switch 850, and completing the circuit by way of wire 951, which calls the elevator to the main floor. The usual time lag elevator device delays acceptance of this call until the automobile has begun to roll onto the elevator. When relay 859 was de-energized at the time of opening of switch 857, switch 863 de-energized relay 209 (see Fig. 31) which had the effect of rotating the selector 150a to energize contact button 737a. This contact calls the transport to either hoistway 16c or hoistway 16a, according to whether current flows from this contact over wire 481 (see Fig. 32) through switch 855 or switch 866 (see Fig. 34), that one of these two switches which corresponds to the elevator which is in operation being at that time closed. Upon the completion of the movement of the transport to one of these two elevator positions (i. e. hoistway 16c in the case assumed for purposes of explanation), the selector wheel moves forward to contact button 738a, which operates tilting motor 41a to roll the car from the transport onto the elevator. Since this contact 738a, however, is connected to the tilting motor control through wires 613 and 614, leading to and from normally closed switches 858 and 955, this tilting motor on the carriage cannot operate until the elevator (either 10c or 10a) reaches the third floor, and by its hoistway door trips the switch 809 and de-energizes relay 849 or 864, as the case may be, and completes the connection between contact 738a and the tilting motor control relay. Upon completion of the tilting operation, the photoelectric cell assemblies 821 and 822 energize relay 823, which completes the door closing circuit 923 by closing the switch 877, which in turn by standard automatic elevator control starts the elevator upon its downward path. When it reaches the main floor, the main floor unparking hoistway door trips two switches, 867 and 878. Switch 867 breaks the circuit through relay 868, which has the effect of resetting all switches for another call, and switch 878 closes, conducting current to relay 879, which operates tilting motor 820 on the elevator in the same manner as it was operated by its other control relay 834. Switch 880 locks in the relay 879, and switch 881 conducts current to motor 820. Limit switch 839 resets the tilting mechanism control of the elevator. As soon as the photoelectric cell assemblies 821 and 822 upon the elevator close the hoistway door circuit, this door closes, and the elevator control is made ready for another call.

*Car handling sequence*

The contact buttons 704a, 705b, etc., on the three stall selectors 150a, 150b, and 150c are connected electrically to effect a sequence of car handling operations to park or unpark cars from third floor stalls 9g, 9h, and 9e, respectively. Considering first selector 150a, controlling the parking or unparking of a car from stall 9g, we find the contact buttons making the following functional connections. The contact button 704a energizes the transport carriage motors through selector switch 53a to move the carriage to a position with its two stations 23' and 23" in registry with stalls 9f and 9e respectively. Contact button 705a operates tilting motor 41f at the rear end of stall 9f to roll the car in that stall onto transport carriage station 23'. Contact button 706a operates tilting motor 41e at the rear end of stall 9e to roll the car in that stall onto transport carriage station 23". Contact button 707a energizes the transport carriage motors through selector switch 53b to move the carriage to a position with its station 23' in registry with stall 9e. Contact button 708a energizes tilting motor 41b at the elevator end of carriage station 23' to roll the car which was initially in stall 9f into stall 9e. Contact button 709a energizes the elevator control devices to call elevator 10c to the main floor, where it receives the car to be parked and then moves to the third floor. Contact button 710a energizes the transport carriage motors through selector switch 53d to move the carriage to a position with its station 23' in registry with elevator hoistway 16c. When the elevator reaches the third floor and the transport carriage is in position, contact button 711a energizes the elevator tilting motor 820 to roll the incoming car onto station 23' of the carriage. Then contact button 712a energizes the carriage motors through switch 53a to return the carriage with station 23' in registry with stall 9f. Contact button 713a energizes tilting motor 41b at the elevator end of station 23' of the carriage to roll the incoming car into stall 9f where it is stopped by the automatic stops 49 with which the stall is equipped. Contact button 714a energizes tilting motor 41f' at the elevator end of stall 9f to roll the car on into stall 9g where it is intended to be parked. Contact button 715a energizes the carriage motors through switch 53b to move the carriage to a position with carriage station 23' in registry with stall 9e. Contact button 715a energizes tilting motor 41e at the rear end of stall 9e to roll the car thereon onto station 23' of the carriage. Contact button 717a energizes the transport carriage motors through switch 43a to move the carriage to a position with carriage station 23' in registry with stall 9f. Contact button 718a energizes tilting motor 41b at the elevator end of carriage station 23' to roll the car thereon, which was initially in stall 9f, back into that stall. Contact button 719a energizes tilting motor 41c at the elevator end of carriage station 23" to roll the car thereon which was initially in stall 9e back into that stall. Contact button 720a energizes the carriage motors through switch 53d to move the carriage to a position with its station 23' in registry with hoistway 16c, where it remains, ready for its next call.

In the process of unparking a car from stall 9g, contact button 728a energizes the transport carriage motors through selector switch 53a, to move the carriage to a position with its two stations 23' and 23" in registry with stalls 9f and 9e respectively. Contact button 729a operates tilting motor 41f at the rear end of stall 9f to roll the car in that stall onto transport carriage station 23'. Contact button 730a operates tilting motor 41e at the rear end of stall 9e to roll the car in that stall onto transport carriage 23". Contact button 731a energizes the transport carriage motors through selector switch 53b to move the carriage to a position with its station 23' in registry with stall 9e. Contact button 732a energizes tilting motor 41b at the elevator end of transport carriage station 23' to roll the car on the carriage station 23' into stall 9e. Contact button 733a energizes the transport carriage motors through selector switch 53a to move the carriage to a position with its station 23' in registry with stall 9f. Contact button 734a operates tilting motor 41g at the rear end of stall 9g to roll the car to be unparked and delivered on the main floor out of stall 9g and into stall 9f, where it is caught and held by the tilting stop at the front end of stall 9f. Contact button 735a operates tilting motor 41f at the rear end of stall 9f to roll the car to be unparked onto carriage station 23'. Contact button 736a energizes the elevator control devices to call either elevator 10c or elevator 10a to the third floor. Contact button 737a energizes the carriage motors through selector switch 53d or selector switch 53c, depending upon whether switch 855 or switch 866, respectively, is closed, to move the carriage to a position such that its station 23' is in registry with hoistway 16c or 16a, respectively. When the elevator reaches the third floor and the transport carriage is in position, contact button 738a operates tilting motor 41a to roll the car on station 23' onto the elevator, which then proceeds automatically as explained in describing the elevator control to carry the car to the main floor and roll it onto the delivery station 19c or 19a as the case may be. Contact button 739a then energizes the carriage motors through switch 53b to move the carriage to a position with carriage station 23' in registry with stall 9e. Contact button 740a operates tilting motor 41e at the rear end of stall 9e to roll the car thereon which was initially in stall 9f onto carriage station 23'. Contact button 741a energizes the transport carriage motors through selector switch 53a to move the carriage to a position with its stations 23' and 23" in registry with stalls 9f and 9e respectively. Contact button 742a operates tilting motor 41b to roll the car on carriage station 23' into stall 9f, which was its initial position. Contact button 743a operates tilting motor 41c to roll the car on carriage station 23" into stall 9e, which was its initial position. Contact button 744a energizes the carriage motors through selector switch 53d to move the carriage to its home station, which is preferably such that its station 23' is in registry with one of the hoistways, e. g. 16c.

It will be observed that stall selector 150a of necessity operates the carriage, the tilting motors, and the elevator with the same sequence of functions to park or unpark a car in or from stall 9g, irrespective of whether there is an interfering car in stall 9f or an interfering car in stall 9e, or interfering cars in both these stalls. Even though both stalls 9e and 9f are empty, the sequence is the same, and some of the movements of the car handling devices are performed idly. It requires a few extra seconds to perform such unnecessary carriage and tilting mechanism movements when stall 9e and 9f, one or both, are unoccupied, but the standardization of equipment makes this necessary, and it is less expensive than the provision of automatic mechanism for eliminating these idle movements. The sequence for stall 9g is similar only to that of the rear stall in the other corner of the bay.

The contact buttons of stall selector 150b are electrically connected to park or unpark a car in or from stall 9h, and have a sequence of operations similar to all the rear stalls except 9g and the other extreme corner stall. To park, the carriage is first moved with its station 23" in alignment with stall 9e. A car therein is moved onto the carriage station 23". The elevator is called to main floor, receives the car, and proceeds to the third floor. The carriage is moved to the elevator hoistway, receives the car, and is moved to a position with its station 23' in registry with stall 9e. The car is rolled first into stall 9e, then into stall 9h behind it. The carriage is shifted to a position such that its station 23" is in registry with stall 9e, where the car on station 23" is rolled back into stall 9e from whence it was removed. The carriage is then returned to hoistway 16c. The unparking sequence is in reverse order.

Stall selector 150c is connected to park or unpark a car directly in or from stall 9e which is typical of all the front stalls. In parking, the elevator 10c is called to the main floor, receives the incoming car, and proceeds to the third floor. The carriage is called to hoistway 16c. The car is rolled thereon, taken to the stall, and rolled into it. The carriage then returns to its position in registry with hoistway 16c. The unparking sequence is in reverse order.

Certain features of my invention are capable of embodiment independently of an elevator, either on any one floor or in a building having only one floor, and in so far as such features are concerned, the elevators with their car guides, car stops, and tilting mechanisms can be considered as stationary structures and equivalent to initial receiving or delivery stations, as the case may be.

I claim as my invention:

1. A method of operating an automatic automobile storage system, the automatic operation of which is conditioned upon a car being removed from the same storage position as that in which it was placed, the system including a first front stall and a rear stall arranged in longitudinal alignment therewith, a second front stall, said first front stall and second front stall being occupied with a first automobile and a second automobile respectively, a transport carriage provided with a first station and a second station, the carriage being mounted to be moved in a path across the front ends of said front stalls with its first and second stations correspondingly adjacent said first and second front stalls respectively, and an initial station arranged to deliver an automobile to said transport carriage and occupied by a third automobile to be parked, the method including the steps of: positioning the carriage with its first station in alignment with the first front stall and its second station in alignment with the second front stall, and moving the first and second automobiles onto the first and second stations respectively; moving the carriage to a position with its first station in alignment with the second front stall; moving the first automobile from the carriage into the second front stall; moving the carriage to a position with its first station in alignment with the initial station; moving the third automobile onto the first station; moving the carriage to a position with its first station in alignment with the first front stall; moving the third automobile from the first station to the first front stall and thence to the rear stall; moving the carriage to a position with its first station in alignment with the second front stall; moving the first automobile onto the first station; moving the carriage to a position with its first station in alignment with the first front stall and its second station in alignment with the second front stall; and moving the first and second automobiles into the first and second front stalls respectively.

2. A method of operating an automatic automobile storage system, the automatic operation of which is conditioned upon a car being removed from the same storage position as that in which it was placed, the system including a first front stall and a rear stall arranged in longitudinal alignment therewith, a second front stall, said first front stall, said second front stall and said rear stall being occupied with a first automobile, a second automobile and a third automobile respectively, a transport carriage provided with a first station and a second station, the carriage being mounted to be moved in a path across the front ends of said front stalls with its first and second stations correspondingly adjacent said first and second front stalls respectively and an initial station arranged to receive an automobile from the transport carriage, the method including the steps of: positioning the carriage with its first station in alignment with the first front stall and its second station in alignment with the second front stall, and moving the first and second automobiles onto the first and second stations respectively; moving the carriage to a position with its first station in alignment with the second front stall; moving the first automobile from the carriage into the second front stall; moving the carriage to a position with its first station in alignment with the first front stall; moving the third automobile from the rear stall into the front stall and thence onto the first station; moving the carriage to a position with its first station in alignment with the initial station; moving the third automobile from the first station onto the initial station; moving the carriage to a position with its first station in alignment with the second front stall; moving the first automobile from the second front stall onto the first station; moving the carriage to a position with its first station in alignment with the first front stall and its second station in alignment with the second front stall; and moving the first and second automobiles into the first and second front stalls respectively.

3. In an automobile storage system: a plurality of storage stalls; a plurality of intermediate automobile stations; a plurality of means for severally moving an automobile by stages from one of said stations to another of said stations and finally to one of said storage stalls, and from one of said storage stalls by stages to successive intermediate stations; and a master chronologically step-by-step operated selective controller corresponding to each of said stalls, respectively, and provided with a plurality of actuating means each of which is associated with one of said moving means, each of which is energized by one step of the operation of its associated controller and each controller being adapted to operate those of said several moving means in that predetermined sequence requisite to move an automobile through said intermediate stations to its corresponding stall, or from its corresponding stall through said intermediate stations, and each controller being operatively connected to be controlled in its step-by-step operation by the concurrent operation of one or more of said moving means.

4. In an automobile storage system: a plurality of storage stalls; a plurality of intermediate automobile stations; a plurality of means for severally moving an automobile by stages from one of said stations to another of said stations and finally to one of said storage stalls, and from one of said storage stalls by stages to successive intermediate stations; a master chronologically step-by-step operated selective controller corresponding to each of said stalls, respectively, and provided with a plurality of actuating means each of which is associated with one of said moving means and each of which is energized by one step of the operation of its associated controller, and each controller being adapted to operate those of said several moving means in that predetermined sequence requisite to move an automobile through said intermediate stations to its corresponding stall, or from its corresponding stall through said intermediate stations, and each controller being operatively connected to be controlled in its step-by-step movement by the concurrent operation of one or more of said moving means; and a plurality of manually operated switches, each associated with and adapted to energize one of said controllers.

5. In an automobile storage system: a plurality of storage stalls having designating characters; a plurality of intermediate automobile stations; a plurality of means for severally moving an automobile by stages from one of said stations to another of said stations and finally to one of said storage stalls, and from one of said storage stalls by stages to successive intermediate stations; a master selective controller for each of said stalls, each such controller being adapted to operate those of said several means in that predetermined sequence requisite to move an automobile through said intermediate stations to its corresponding stall, or from its corresponding stall through said intermediate stations; a plurality of ticket dispensers, each of which is solely associated with one of said stalls; a plurality of switches, each mounted to be operated by the movement of a ticket in its associated dispenser and each adapted to energize that one of the said controllers which is associated with that dispenser and a plurality of tickets in each of said dispensers, all of the tickets in one dispenser having marked thereon a designating character corresponding to that of the stall associated with that dispenser.

6. In an automobile storage system: a plurality of storage stalls having designating characters; a plurality of intermediate automobile stations; a plurality of means for severally moving an automobile by stages from one of said stations to another of said stations and finally to one of said storage stalls, and from one of said storage stalls by stages to successive intermediate stations; a master selective controller for each of said stalls, each such controller having two portions, the first portion being adapted to operate those of said several means in that first predetermined sequence requisite to move an automobile through said intermediate stations to its corresponding stall, and the second portion being adapted to operate those of said several means in that second predetermined sequence requisite to move an automobile from its corresponding stall through said intermediate stages; a plurality of ticket dispensers, each of which is solely associated with one of said stalls; a plurality of first switches, each switch associated with one of said ticket dispensers and one of said controllers and adapted to be operated by a movement of a ticket in its dispenser, and connected to energize said first portion of its associated controller; a plurality of second switches, each switch associated with one of said ticket dispensers and one of said controllers and adapted to be operated by a further movement of the same ticket in its dispenser, and connected to energize said second portion of said associated controller; and a plurality of tickets in each of said dispensers, all of the tickets in one dispenser having marked thereon a designating character corresponding to that of the stall associated with that dispenser.

7. In an automobile storage system: a plurality of storage stalls; a plurality of intermediate automobile stations; a plurality of means for severally moving an automobile by stages from one of said stations to another of said stations and finally to one of said storage stalls, and from one of said storage stalls by stages to successive intermediate stations; and a master chronologically step-by-step operated selective controller for each of said stalls, each such controller being provided with a plurality of actuating means each of which is associated with one or more of said moving means, and each of which is energized by one step of the operation of its associated controller and each such controller having two groups of actuating means, the first group being adapted to operate those of said several means in that first predetermined sequence requisite to move an automobile through said intermediate stages to its corresponding stall, and the second group being adapted to operate those of said several means in that second predetermined sequence requisite to move an automobile from its corresponding stall through said intermediate stages, each such controller portion being inoperable during the continuance of the predetermined sequence of means operations controlled by the other portion, and each controller being operatively connected to be controlled in its step-by-step operation by the concurrent operation of one or more of said moving means.

8. In an automobile storage system: two stalls; automobile moving devices arranged to move automobiles with respect to their occupation of said stalls, including a single automobile moving device arranged to move automobiles with respect to their occupation of either one of said stalls; a first control means individually associated with one of said stalls; a second control means individually associated with the other of said stalls, each of said control means being adapted to be initiated in its operation by an act of the operator and after initiation to automatically, in a predetermined sequence, operate some of said devices including said single moving device, each in a predetermined complete cycle of movements of predetermined character to a predetermined terminal position to move an automobile with respect to its occupation of the associated stall; and means for automatically holding in abeyance the operation of the later initiated of said two control means pending completion by said single moving device, under the control of the prior initiated control means, of the predetermined cycle of movements of said single moving device.

9. In an automobile storage system: a plurality of stalls; automobile moving devices arranged to move automobiles with respect to their occupation of said stalls, including a single automobile moving device arranged to move automobiles in the process of moving them with respect to their occupation of any one of said stalls; a plurality of control means individually and respectively associated with said stalls, each of said control means being adapted to be initiated in its operation by an act of the operator and after initiation to automatically, in a predetermined sequence, operate some of said devices including said single device each in a predetermined complete cycle of movements of predetermined character to a predetermined terminal position to automatically move an automobile with respect to its occupation of that stall with which said control means is associated; and means for automatically holding in abeyance the operation of all but a chronologically first initiated control means of a predetermined number of sequentially initiated control means, pending the completion by said single moving device under the control of said first initiated control means of the predetermined cycle of movements of said single moving device, and reactuating said control means held in abeyance in the same chronological sequence as that in which they were initiated by the operator, each being held in abeyance pending the completion by said single moving device under the control of the next prior initiated control means of the predetermined cycle of movements of said single moving device.

10. In an automobile storage system: a plurality of stalls; a plurality of intermediate stations; a receiving station; a plurality of means some for moving automobiles between said receiving station and said intermediate stations and some for moving automobiles between said intermediate stations and said stalls; a plurality of control means each adapted to operate selectively in an automatically effected predetermined sequence, at least a portion of said moving means to move an automobile between said receiving station and one of said stalls respectively; a plurality of means for initiating the actuation of said control means respectively; means for holding in abeyance pending the completion of the operation of said moving means by a chronologically first initiated control means the actuation of other control means initiated during said operation of said moving means by said chronologically first initiated control means; and means for re-actuating said control means held in abeyance in the same chronological sequence as that in which they were initiated, the re-actuation of each control means being held in abeyance until the completion of the operation of said moving means by the chronologically next prior initiated control means.

11. In an automobile station: a pair of wheel guides; means for inclining said guides toward one of their ends; a stop mounted adjacent said end of said guides and tiltable in either direction to permit movement of an automobile in either direction on said guides; and mating abutments on said stop and one of said guides respectively, each having a vertical face, said vertical faces being arranged to contact each other to resist movement of the stop in a direction to permit movement of an automobile toward said adjacent end of said guides when said guides are horizontal, and to become vertically disengaged as the guide abutment moves upward when said guides are inclined toward said adjacent end, said disengagement permitting the stop to have a tilting movement in said direction to permit movement of an automobile toward said adjacent end.

12. In an automobile station: a pair of wheel guides; means for tilting the guides in one direction, maintaining them in tilted position a sufficient time interval for unloading an automobile therefrom by the action of gravity and returning them to their initial position in a chronological cycle; a motor for operating said means; a control system for said motor, adapted while energized to supply current to said motor, including a self-locking relay adapted when energized to maintain energization of said control system; a quick acting, normally closed, make and break switch connected to de-energize said relay and consequently said control system; and means operated by said tilting means at the end of its cycle of operation to operate said switch and thereby momentarily de-energize said self-locking relay.

13. In an automobile storage system: a plurality of stalls; a plurality of means adapted to move an automobile with respect to its occupation of any one of said stalls; a plurality of control systems each associated with one of said stalls respectively and each adapted when initially energized to selectively and automatically operate in an associated predetermined sequence at least a portion of said means to move an automobile with respect to its occupation of said associated stall, the associated operation of each of said means by any one of said control systems being in a predetermined complete cycle of movements of predetermined character; means for initially energizing successively a plurality of said control systems; means for holding in abeyance up to a predetermined number all but one of said control systems thus initially energized pending the completion of the operation of said automobile moving means under the control of said one control system; and an indicating device arranged to be actuated during the time said control systems in number equal to the predetermined number are being held in abeyance.

14. In an automobile storage system: a storage building having a plurality of floors; a first and a second elevator hoistway in said building; a first elevator and a second elevator movable in said hoistways respectively and serving said floors; a storage stall on each of said floors; a means on each of said floors for moving an automobile between each of said hoistways and the stall on that floor; a first elevator control means for said first elevator; a second elevator control means for said second elevator; a parking control means associated with each of said stalls respectively of a first group connected to actuate said first elevator control means to move said first elevator to the floor of the associated stall and to actuate in a cycle chronologically cooperatively related to the movements of said elevator the associated one of said moving means to move an automobile from said first elevator hoistway to the associated stall; a parking control means associated with each of said stalls respectively of a second group connected to actuate said second elevator control means to move said second elevator to the floor of the associated stall and to actuate in a cycle chronologically cooperatively related to the movements of said elevator the associated one of said moving means to move an automobile from said second elevator hoistway to the associated stall; an unparking control means associated with each of said stalls respectively of said first and second groups connected to actuate the associated one of said moving means to move an automobile from the associated stall selectively to said first or said second hoistway and to actuate the control means of said first or said second elevator in chronologically cooperative relationship with the movements of said moving means; and a selective control means controlled by said first elevator control means and said second elevator control means for selectively connecting that one of the said first and second elevator control means associated with the first available elevator for actuation by said unparking control means, said unparking control means being connected to be controlled by the control means of either elevator upon its being thus selectively connected for operating said moving means to move an automobile to the corresponding hoistway in chronologically cooperative relationship with the movements of the elevator controlled by said selected elevator control means.

15. In an automobile storage system: a storage stall bearing a designating character; power devices for moving an automobile to or from said stall; an electrically energized control system for said power devices adapted to selectively operate said power devices in a first predetermined sequence to move an automobile to said stall, and to selectively operate said power devices in a second predetermined sequence to move an automobile from said stall; a ticket dispenser provided with a first electric switch connected to operate said control system to effect said first predetermined sequence, and a second electric switch connected to operate said control system to effect said second predetermined sequence; and a plurality of tickets fitted to said dispenser all having marked thereon the same designating character as that of the storage stall and adapted in their movement through said dispenser to operate said switches successively and to throw out of operation each of said switches prior to the operation of the other said switch.

16. In an automobile storage system, the combination of: a storage stall bearing a designating character; power devices for moving an automobile to or from said stall; an electrically energized control system for said power devices, adapted to operate said power devices in a first predetermined sequence to move an automobile to said stall and in a second predetermined sequence to move an automobile from said stall; a ticket dispenser provided with a first switch and a second switch connected to operate said control system in said first and second predetermined sequences respectively; and a plurality of tickets in said dispenser, each ticket having a first part and a second separate part and being adapted as the first part thereof leaves the dispenser to operate said first switch, and as the second part leaves the dispenser to operate said second switch, both parts of all of said tickets having marked thereon the same designating character as that identifying said stall.

17. In an automobile storage system: the combination of: a storage stall; power devices for moving an automobile to or from said stall; an electrically energized control system for said power devices, adapted to operate said power devices in a first predetermined sequence to move an automobile to said stall and in a second predetermined sequence to move an automobile from said stall; a ticket dispenser provided with a first switch and a second switch connected to operate said control system in said first and second predetermined sequences respectively; and a plurality of tickets in said dispenser, each ticket having a first part and a second separate part of different color and being adapted as the first part thereof leaves the dispenser to operate said first switch, and as the second part leaves the dispenser to operate said second switch.

18. In an automobile storage system: storage stalls having distinguishing identifying characters associated therewith; a ticket dispenser corresponding to each of said stalls and having marked thereon the same identifying character as that of its corresponding stall; and a plurality of tickets in each of said dispensers, each ticket having two separable parts of different colors, adapted to be withdrawn successively from said ticket dispenser, and each part of all of said tickets in any one dispenser having marked thereon the same identifying character as that of the corresponding stall.

19. In an automobile storage system: a storage stall; power devices for moving an automobile to or from said stall; an electrically energized control system for said power devices adapted to operate said power devices in a first predetermined sequence to move an automobile to said stall, and in a second predetermined sequence to move an automobile from said stall; a ticket dispenser provided with a first switch and a second switch connected to operate said control system in said first and second predetermined sequences respectively; a ticket guide on said dispenser having a first ticket limit stop and a second ticket limit stop; and a continuous strip of a plurality of separable tickets in said dispenser, each ticket having a first part and a second separable part and being adapted as the first part thereof leaves the dispenser to operate said first switch, and as the second part thereof leaves the dispenser to operate said second switch, said first part being shaped to engage said first limit stop, and said second part being shaped to engage said second limit stop, whereby the said parts are each held in definite switch operating position.

20. In an automobile parking system: a plurality of storage stalls; a plurality of automobile moving devices for placing automobiles in said stalls and removing them from said stalls; a plurality of control systems, each adapted to operate said automobile moving devices selectively in a first predetermined sequence to place an automobile in a corresponding one of said stalls and in a second predetermined sequence to remove it from a corresponding one of said stalls; a plurality of movable ticket dispensers associated respectively with said control systems; a stationary support for said ticket dispensers; a first and a second electric switch in said dispensers adapted to be operated by the removal of tickets therefrom, said switches being connected to energize said control systems to effectuate said first and second predetermined sequences, respectively; first electric terminals on said dispensers electrically connected to said switches; and second electric terminals stationarily mounted and connected to said control systems and adapted for separable connection with said first electric terminals.

21. In an automobile parking system: a plurality of storage stalls; a plurality of automobile moving devices for placing automobiles in said stalls and removing them from said stalls; a plurality of control systems, each adapted to operate said automobile moving devices selectively in a first predetermined sequence to place an automobile in a corresponding one of said stalls and in a second predetermined sequence to remove it from a corresponding one of said stalls; a plurality of movable switch boxes associated respectively with said control systems; a stationary support for said switch boxes; a first and a second electric switch in said switch boxes, said switches being connected to energize said control systems to effectuate said first and second predetermined sequences, respectively; first electric terminals on said switch boxes electrically connected to said switches; and second electric terminals stationarily mounted and connected to said control systems and adapted for separable connection with said first electric terminals.

22. In an automatic parking system: an initial station; a stall; a plurality of functional means for moving an automobile from said station to said stall; a master controller for successively actuating said functional means, having a plurality of electrical contacts arranged in a fixed series relationship, each of which is connected to initiate actuation of one of said means, and having a common electrical contact movable with respect to said electrical contacts to electrically engage said electrical contacts seriatim; electrical means for advancing said common contact with respect to said electrical contacts in a series of steps, each step advancing said common contact to a position of electrical engagement with one of said electrical contacts, and mechanical means operatively disconnected from any of said functional means for advancing said common contact to neutral positions, each disposed between two of said electrical contacts, said mechanical means being responsive to the initiation of actuation of each of said functional means; a plurality of releasable self-locking means adapted to maintain actuation of each of said functional means, respectively; means automatically responsive to the termination of the operation of each of said functional means for releasing the self-locking means associated with that particular functional means; and means for operating said electrical advancing means to move the common contact from a neutral position to a position of engagement with one of said electrical contacts responsive to the release of each of said self-locking means.

23. In an automobile storage system: a plurality of storage stalls; mechanism for moving an automobile to or from any one of said stalls; a plurality of selective progressively movable controllers associated respectively with said stalls, each of which upon reaching a given position is adapted to operate said mechanism with respect to its occupation of the associated stall; a plurality of devices adapted to operate said controllers respectively; a plurality of means for initiating the operation of said devices, respectively, said initiating means being capable of sequential operation; means common to all of said controllers and responsive to the chronologically first arrival of any one of said controllers to its said given position for suspending the operation of the others of said controller operating devices; and means for successively restoring to operative condition, in the same sequence as that in which said initiating means are operated, the said suspended controller operating devices, each upon completion of the operation of said mechanism under the control of the controller next earlier to arrive at its said given position.

24. In an automobile station: a wheel guide; means for tilting said guide in one direction; an automobile engaging stop projecting vertically upward; a stationarily mounted bearing support in which said stop is pivotally mounted upon a horizontal axis which is transverse to said wheel guide; means for yieldably holding said stop in vertical position to engage an automobile; a first lug secured to said stop; and a second lug secured to said wheel guide in a position to engage said first lug to prevent angular movement of said stop about its pivotal support from the vertical in said one direction, said second lug being mounted to be disengaged from said first lug upon said guide being tilted in said one direction.

25. In an automobile station: a wheel guide; means for tilting said guide in either direction; an automobile engaging stop projecting vertically upward; a stationarily mounted bearing support in which said stop is pivotally mounted upon a horizontal axis which is transverse to said wheel guide; means for yieldably holding said stop in vertical position to engage an automobile; a first lug secured to said stop; a second lug secured to said wheel guide in a position to engage said first lug to prevent angular movement of said stop about its pivotal support from the vertical in one direction, said second lug being mounted to be disengaged from said first lug upon said guide being tilted in said one direction; and an additional similarly assembled stop, bearing support, holding means, and first and second lugs, arranged to prevent angular movement of said additional stop in the other direction, and to effect the disengagement of said additional first and second lugs upon said guide being tilted in said other direction.

26. In an automobile parking system, an automobile station comprising: a horizontally arranged automobile wheel guide having a tread and a flange; a stationary support; a stop for engaging the wheel of an automobile, said stop being pivoted horizontally on said support on an axis transverse to said wheel guide and below said wheel guide; two upwardly extending fingers on said stop projecting through said flange; a tire engaging roller mounted at the upper end of each of said fingers; a depending weight on said stop disposed below the pivotal axis of said stop; means for elevating said wheel guide; and abutting lugs on said stop and said wheel guide, respectively, designed to prevent oscillatory movement of said fingers in one direction, said lugs being arranged to disengage upon the elevation of said wheel guide.

27. In an automobile parking system, an automobile station comprising: an automobile supporting platform; a stationary support at each end of said platform upon which said platform is loosely supported; means for rotating either end of said platform above said stationary support about the other end as a center; and means on the platform ends engaging the stationary support for preventing horizontal displacement of said platform both transversely and longitudinally with respect to said supports at all positions vertically of either end of said platform with respect to its adjacent support.

28. In an automobile parking system, an automobile station comprising: an automobile supporting member; a stationary supporting member at each end of said automobile supporting member upon which said automobile supporting member is loosely supported; a horizontal transverse pin on one of said members at each point of support; a finger on the other of said members at each point of support adapted to vertically slidably engage the adjacent pin; and means for elevating either end of said automobile supporting member about the other end as a center.

29. In an automobile parking system, an automobile station comprising: a pair of parallel, horizontally arranged automobile wheel supporting guides; a transverse horizontal rod at each end of said guides upon which said guides are loosely supported; a downwardly opening slotted finger secured to each end of each of said guides, each said finger embracing the adjacent one of said rods; and means for elevating either end of each pair of guides about the other end as a center.

30. In an automobile parking system, the combination of: an automobile supporting platform; means for inclining and leveling said platform in one continuous cycle; an electric motor for operating said inclining and leveling means; a source of current for said motor; an instantaneous, normally closed make and break switch automatically operated by said inclining and leveling means at the close of the tilting cycle; a source of control current; disconnecting means for said control current; a relay magnet coil connected at one end to said switch and at the other end to said source of control current and also to said source of motor operating current; a first normally open relay switch operated by said coil and interposed between said source of motor operating current and said coil; a second normally open relay switch operated by said coil and interposed between said source of motor operating current and said disconnecting means; and a third normally open relay switch operated by said coil and interposed between said source of motor operating current and said motor.

31. In an automobile storage system: a plurality of storage stalls; a plurality of devices for moving an automobile to said stalls; an electric control system designed to afford selective operation of said automobile moving devices for moving an automobile to any desired one of said stalls in a plurality of predetermined sequences; a plurality of step-by-step operated controllers associated respectively with said stalls and each adapted to assume primary step-by-step positions for the actuation of said control system to move an automobile to its associated stall, and each adapted to assume a definite number of secondary step-by-step positions prior to the assumption of said primary positions; a plurality of means for respectively operating said controllers; means operable upon the assumption of a chronologically first controller of its first primary position for establishing a continuing disconnection of the controller-operating means of a chronologically second controller when said second controller assumes the last of its said secondary positions; means thereupon operable by said last mentioned means for establishing a continuing disconnection of the controller-operating means of a chronologically third controller when said third controller assumes the position next preceding the last one of its secondary positions; and additional similar means in the same relationship associated with the remainder of the number of said secondary positions, all of said disconnecting means being releasable in the order of their establishment for the advancement by one position of their respectively associated controllers as that controller which is in process of actuating its associated control system completes such actuation.

32. In an automobile storage system: a plurality of storage stalls; a plurality of devices for moving automobiles to said stalls; an electric control system designed to afford selective operation of said automobile moving devices for moving an automobile to any desired one of said stalls in a plurality of predetermined sequences; a plurality of step-by-step operated controllers associated respectively with said stalls and each adapted to assume primary step-by-step positions for the actuation of said control system to move an automobile to its associated stall, and each adapted to assume a definite number of secondary step-by-step positions prior to the assumption of said primary positions; a plurality of means for respectively operating said controllers; means operable upon the assumption of a chronologically first controller of its primary position for establishing a continuing disconnection of the controller-operating means of a chronologically second controller when said second controller assumes the last of its secondary positions; means thereupon operable by said last mentioned means for establishing a continuing disconnection of the controller-operating means of a chronologically third controller when said third controller assumes the position next preceding the last one of its secondary positions; additional similar means in the same relationship associated with the remainder of the number of said secondary positions, all of said disconnecting means being releasable in the order of their establishment for the advancement by one position of their respectively associated controllers as that controller which is in process of actuating its associated control system completes such actuation; and indicating means arranged to afford a signal upon and during disconnection of the controller-operating means of a controller established by said controller assuming its first secondary position.

33. In an automobile storage system: a plurality of storage stalls; devices for moving automobiles to or from said stalls; a plurality of control systems for selectively operating said devices in a plurality of pairs of predetermined sequences respectively for parking automobiles in or unparking them from said stalls respectively; a ticket box associated with each stall; a ticket of two parts of different appearance adapted to be withdrawn from each of said ticket boxes, one part of which is adapted when withdrawn to actuate said parking sequence, and the other part of which is adapted when withdrawn to actuate said unparking sequence, one part or the other of said tickets always being in sight of the operator, whereby it is apparent to the operator whether the stall corresponding to any ticket box is or is not occupied according to which part of said ticket is in position next to be withdrawn; and an indicator associated with each of said boxes, connected to be operated upon the actuation of either of said parking or unparking sequences.

34. In an automobile storage system: a plurality of automobile stations; a plurality of means for moving an automobile between said stations; a control system for operating all or some of said means in a plurality of predetermined sequences; a photoelectric cell mounted to send a light beam across the path of movement of an automobile at a point other than the points occupied by an automobile while stationary at any of said stations; and means responsive to the interruption of said beam for preventing said control system from operating the automobile moving means subsequently operated in a pending sequence.

35. In a storage system: a storage building having a receiving floor, a delivery floor, and a plurality of storage floors; an elevator serving a plurality of said floors and having a standard single-call elevator control system; a plurality of storage facilities on each of said storage floors; and a control system for said storage system, comprising a selective controller governing said elevator control system having a series of call actuating contacts adapted to be engaged successively in a continuous uni-directional sequence, every other one of said contacts being connected to initiate said elevator control system to move said elevator first to said receiving floor and then to one of said storage floors, and the remaining alternate contacts being connected to initiate said elevator control system to move said elevator first to one of said storage floors and then to said delivery floor.

36. In a storage system: a storage building having a receiving floor, a delivery floor, and a plurality of storage floors; an elevator serving a plurality of said floors and having a standard single-call elevator control system; a plurality of storage facilities on each of said storage floors; a control system for said storage system, comprising a selective controller governing said elevator control system having a series of call actuating contacts adapted to be engaged successively in a continuous uni-directional sequence, every other one of said contacts being connected in multiple to initiate said elevator control system to move said elevator first to said receiving floor and then to any one of said storage floors, and each of the remaining alternate contacts being connected to initiate said elevator control system to move said elevator to an associated one of said storage floors and then to said delivery floor; and means for selectively connecting said multiple connected contacts to move said elevator to any desired storage floor.

37. In a storage system: a storage building having a receiving floor, a delivery floor, and a plurality of storage floors; an elevator serving a plurality of said floors and having a standard single-call elevator control system; a plurality of storage facilities on each of said storage floors; a control system for said storage system, comprising a selective controller governing said elevator control system having a series of call actuating contacts adapted to be engaged successively in a continuous uni-directional sequence, each of a plurality of said contacts being connected to initiate said elevator control system to move said elevator to an associated one of said storage floors and then to said delivery floor; a plurality of means for selectively energizing any one of said contacts, respectively, more than one of which means are capable of being energized simultaneously; and means responsive to any and all of said energizations for moving the controller and stopping it successively at each energized contact pending the completion of the movements of the elevator executed by the elevator control system when said elevator control system is initiated by that contact.

38. In a storage system: a storage building having a receiving floor and a plurality of storage floors; an elevator serving a plurality of said floors and having a standard single-call elevator control system; a plurality of storage facilities on each of said storage floors; and a control system for said storage system, comprising a selective controller governing said elevator control system having two kinds of initiating contacts, one kind being adapted to automatically on a single initiation of movement of said selective controller to progressively initiate said elevator control system to move an elevator from a parked position at any of said floors to said receiving floor and thereafter to a desired storage floor, and the other kind being adapted to automatically on a single initiation of movement of said selective controller to progressively initiate said elevator control system to move an elevator from a parked position at any of said floors to a desired storage floor and thereafter to said delivery floor.

39. In a storage system: a storage building having a receiving floor, a delivery floor, and a plurality of storage floors; a plurality of storage facilities on each of said storage floors; two elevator hoistways; an elevator in each of said hoistways serving said floors, each elevator having a standard single-call elevator control system; power-operated transport carriages installed on said floors, adapted to move a stored article horizontally from any desired storage facility to either of said hoistways; and an automatic super control system for said power-operated carriages and said elevator control systems adapted to selectively initiate the elevator control system of the elevator chronologically first available to move said elevator to the floor of said desired storage facility, to selectively move the carriage on the floor of said desired facility to the hoistway of the selected elevator for loading a stored article on said elevator from said carriage, and to thereafter initiate said control system of said selected elevator to move said selected elevator to said delivery floor.

HOWARD F. MASON.

CERTIFICATE OF CORRECTION.

Patent No. 2,204,023.  June 11, 1940.

HOWARD F. MASON.

It is hereby certified that error appears in the printed specification of the above numbered patent requiring correction as follows: Page 4, first column, line 72, for "the" read --The--; page 10, first column, line 60, for "Throughtout" read --Throughout--; page 11, second column, line 30, for the word "designated" read --designating--; line 43, for "on" read --of--; page 13, first column, line 61, for the reference numeral "209" read --293--; page 15, first column, line 71, for "159a" read --150a--; page 16, first column, line 51, for "41b" read --41a--; and second column, line 24, for "Fig. 13" read --Fig. 31--; page 23, second column, line 52-53, claim 7, for the word "portion" read --group--; and that the said Letters Patent should be read with this correction therein that the same may conform to the record of the case in the Patent Office.

Signed and sealed this 13th day of August, A. D. 1940.

(Seal)

Henry Van Arsdale,
Acting Commissioner of Patents.